(12) United States Patent
Hale

(10) Patent No.: US 10,718,621 B2
(45) Date of Patent: *Jul. 21, 2020

(54) SYSTEM FOR PRODUCING COMPACT LOCATION CODES

(71) Applicant: Merton G Hale, Brussels (BE)

(72) Inventor: Merton G Hale, Brussels (BE)

(*) Notice: Subject to any disclaimer, the term of this patent is extended or adjusted under 35 U.S.C. 154(b) by 0 days.

This patent is subject to a terminal disclaimer.

(21) Appl. No.: 15/918,402

(22) Filed: Mar. 12, 2018

(65) Prior Publication Data

US 2018/0202817 A1 Jul. 19, 2018

Related U.S. Application Data

(62) Division of application No. 14/651,110, filed as application No. PCT/US2013/074234 on Dec. 11, 2013, now Pat. No. 9,952,052.

(60) Provisional application No. 61/754,157, filed on Jan. 18, 2013, provisional application No. 61/736,539, filed on Dec. 12, 2012.

(51) Int. Cl.
*G01C 21/32* (2006.01)
*G06F 16/00* (2019.01)
*G06F 16/9537* (2019.01)
*G01C 21/36* (2006.01)
*G01C 21/00* (2006.01)
*G06F 16/29* (2019.01)

(52) U.S. Cl.
CPC ............ *G01C 21/32* (2013.01); *G01C 21/00* (2013.01); *G01C 21/3617* (2013.01); *G06F 16/00* (2019.01); *G06F 16/29* (2019.01); *G06F 16/9537* (2019.01)

(58) Field of Classification Search
None
See application file for complete search history.

*Primary Examiner* — Bhavesh V Amin
(74) *Attorney, Agent, or Firm* — Bassett IP Strategies; David F. Bassett

(57) ABSTRACT

The present invention provides a method, the QCODE method, of geotagging all postal addresses and other points of interest that one might want to navigate to and which allows the user to identify these addresses and other points of interest with a code consisting of 7 to 10 characters or less. A point of interest may or may not have a street address, for example, "the main entrance to the Jefferson Building at the USPTO complex in Alexandria Va." or "the entrance to the VIP parking area at Yankee Stadium". The disclosure teaches embodiments that are naturally upgraded to integrate changing spatial information due to addition of countries, better data, political changes, and other similar changes in geographical data. A single geocoding engine is capable of handling the various address formats in use in different countries and jurisdictions.

14 Claims, 14 Drawing Sheets

| Type | Only Standard Code Used | | Special Codes Used | | | | | |
|---|---|---|---|---|---|---|---|---|
| | Standard | Standard | Standard | Site Code | Personal Code | | | Corporate Code |
| Number of characters | 6 | 5 | 6 | 6 | 4 | 5 | 6 | 6 |
| | | | | | | | 7 to 10 | |
| Character set | Base | Base | Base | Base | Full | Full | Full | Base |
| | | | | | | | Full | |
| Max number of region codes | 32 x 32 = 1,024 | 32 | 32 x 32 = 1,024 | unlimited (1) | n/a | n/a | n/a | 32 x 32 = 1,024 (2) |
| | | | | | | | n/a | |
| Maximum permutations of location code | 32^4 = 1,048,576 | 32^4 = 1,048,576 | 32^3 x 24 = 786,432 (3) | 32^4 = 1,048,576 | n/a | 36^5 = 60.4 million | n/a | 32^3 x 2 = 65,536 (4) |
| | | | | | | | n/a | |
| Maximum total permutations of code | 1.07 billion | 33.5 million | 1,024 x 786,432 = 1.07 billion | unlimited (5) | 36^4 = 1.7 million | | 2.1 billion | 67.1 million |
| | | | | | | | billions | |
| Maximum population of canton | 1,800,000 | 1,800,000 | 1,400,000 (6) | n/a | n/a | n/a | n/a | n/a |
| Identification Method | not needed | | 6 characters long, code ends in letter | Satnav device determines if it is located within the geographical boundaries of site. | 4 characters long | 5 characters long | 6 characters long, code ends in number | Code ends in a 6 or 7 |
| | | | | | | | code is longer than 6 characters | |

Notes:
(1) Because site codes can be reused, there are in effect an unlimited number of permutations/site codes available.
(2) 1,024 different businesses can have their own individual corporate code.
(3) When extended codes are used, only letters are used in sixth character of the standard code, reducing the number of permutations to 786,432.
(4) Each corporate code user can have up to 65,536 different codes.
(5) See Note (1)
(6) Number of location code permutations is reduced to 786,432. Thus canton size is reduced to 1,400,000.

FIG. 8

| Type of Code | Example | Notes |
|---|---|---|
| Standard 6 character Code | Mr. John Smith<br>Important Industries<br>258 Swift Street<br>Buffalo, NY 13211<br>qCode: SY-E3R7 | The code is displayed as SY-E3R7, with dash (-) after second character, included for readability only. Actual code is without dash. Software ignores any dashes or spaces entered. |
| Standard 5 character Code | Mr. John Smith<br>Important Industries<br>258 Swift Street<br>Buffalo, NY 13211<br>qCode: SY-E3R | Note, same format as 6 character code but only 5 characters. |
| Standard 6 character Code | Contact us at:<br>Westword Flowers Ltd.<br>46 Mary Lane • Eaton • Hampshire UK SO40 4XR • qCode: HS-345G ||
| Personal Code (7 characters) | J R Smith | Same comment as above. Spaces included only for readability. Spaces do not need to be entered. If they are software will ignore them. |
| Site Code (6 characters) | SU-BBB2 | The code ends in 2 to enable identification as site code. |
| | | West Entrance Stadium Parking<br>Stanford University |
| | | Hall of Languages, entrance<br>Syracuse University |
| Corporate Code (6 characters) | MD-2BA6 | The code for a McDonald's restaurant. Code ends in 6 to enable identification as a corporate code |

FIG. 12

SYSTEM FOR PRODUCING COMPACT LOCATION CODES

CROSS-REFERENCE TO RELATED PATENT APPLICATIONS

This patent application is a continuation of applicants' U.S. patent application Ser. No. 14/651,110 (filed on Jun. 10, 2015, request for continued examination filed on Jul. 17, 2017) which claimed priority based upon provisional patent application 61/736,539 (filed on Dec. 12, 2012); provisional patent application 61/754,157 (filed on Jan. 18, 2013); and PCT application PCT/US2013/074234 (filed on Dec. 11, 2013). The disclosure of these United States patent applications is hereby incorporated by reference into this specification.

TECHNICAL FIELD

The present invention relates to geographic referencing systems and, more particularly, to a method and system for providing an indication of location, so as to facilitate operation of such location-based services.

BACKGROUND ART

A detailed description of the current state of the art in geocoding is provided in 'The Geocode Encyclopedia: A Research for Geographic Entity Object code Systems and Evaluation Perspectives version 1.1' by Naoki Ueda.

The proliferation in recent years of wireless portable devices has increased productivity and convenience. One of these devices has been the portable satellite navigation system (satnav) which uses Global Positioning Satellites system (GPS), electronic maps, and databases stored within the satnav device, and mathematical algorithms to allow a user to identify their location and to determine navigation directions to a desired location.

Geocoding is the process of assigning a latitude/longitude pair to a textual description (frequently an address) of a location. The latitude/longitude pair that identifies a particular location is called a geocode. Geotagging is the process of assigning a code to a particular location (normally identified by a latitude longitude pair of coordinates). The code and the latitude/longitude coordinates together are known as a geotag.

The best known system of identifying a specific location is the latitude-longitude coordinate system which identifies a location on the Earth by latitude and longitude coordinates. This system can specify the location of any point (a latitude and longitude coordinate specific to a particular location) on the Earth, to any degree of accuracy depending upon how precisely the coordinates are identified. Five decimal places of latitude or longitude translate to an accuracy of about 1 meter at the equator.

The majority of existing satnav systems locate an address in one of three ways:
  by using a rough estimation of the exact location of the address (the least accurate method);
  by using an calculated estimation of the exact location of the address (an intermediate accuracy method); or
  by point addressing (the most accurate method).

As those skilled in the art are aware, point addressing is the identification of an actual set of latitude and longitude coordinates for a given specific location.

The method used to locate the address will be determined by the level of detail provided by the map supplier; TeleAtlas (a Dutch company which is a wholly owned subsidiary of TomTom, a Dutch company located in Amsterdam The Netherlands) and NAVTEQ (headquartered in Chicago, Ill. and a wholly owned subsidiary of Nokia Corp.) are the two major suppliers of maps for satnav systems. Point addressing data is becoming increasingly available.

The least accurate method to locate an address is by a rough estimation of the address. For some roads or sections of roads, the only information the map supplier has is the latitude and longitude of the starting point of the road and the ending point of the road. In this case regardless of which address is asked for, the user is always directed to the mid-point of the road by the satnav system.

A method with intermediary accuracy is to locate an address by an estimation of the exact location of the address. A map supplier provides a map database which includes coordinates for roads and critical points of variations in the road. The critical points include such items as start points, end points, radii of curvature, center points of radii of curvature, inflection points, and the like. These variations in the road include items such as where a cross street is intersected, where the road is straight, where the road curves, and the like. Each different segment of the road (straight, curved, and the like) will be considered a separate section of the road. For each section of road, the map database will include a street number and the latitude and longitude for both endpoints of the section and an identification of which side of the street addresses are identified with even street numbers and on which side of the street addresses are identified with odd street numbers.

For addresses located within a section of the road for which the map database does not have the exact coordinates of an address, the satnav system will make estimation. As an example, a desired address is 300 Main Street. The database does not contain the exact latitude and longitude of this address. However, the database contains the information that Main Street is 900 meters long and starts at Point A (specified by latitude and longitude), with house numbers beginning with 100, and ends at Point B (specified by latitude and longitude) with house number 160, 60 house numbers away. For a road nine hundred meters long, with 60 house numbers, 30 assumed on each side of the road, it is assumed that each house number pair (corresponding even and odd numbers) is 30 meters apart.

In this example, the satnav system assumes that all house numbers are spaced equally along the road and that there are an equal number of house numbers on each side of the road. So the house number 140 is assumed (calculated) to be 66.7 percent of the way along this stretch of road. The stretch of road from Point A to Point B is 900 meters long. Thus, the address is calculated to be 66.7 percent of 900 meters along the road—600 meters down the road from Point A. The satnav system will guide the user desiring to reach number 140 to this location. There are obvious errors to this system, the main one being that the house numbers are probably not evenly distributed along the road. This is why the satnav system does not always guide a user to exactly the "front door" of the address. However, in most cases the satnav system gets the user "close enough" for the user to be satisfied with the system.

The most accurate method to locate an address is by using "point addressing." In this method, a map supplier will provide the actual latitude and longitude location of each address. This is a more expensive means of identifying each address relative to other address estimation methods, as each address will need to be individually identified and located. In many cases this has to be done by actually driving along the road with a specially equipped vehicle and marking what the latitude and longitude coordinates are of each address as a plotter drives past the address. This addressing method may be expanded out to entire building campuses. An example would be NAVTEQ "micropoint" addresses provided by the map supplier NAVTEQ.

NAVTEQ typically provides two distinct locations for each address, a point on the road in front of a building located at the particular address and a point that is the centroid of the roof of the building for the address. Typically NAVTEQ addresses provide the latitude and longitude of the location/address to five decimal places, an accuracy of about 1 meter at the equator.

Understanding Administrative Divisions

For purposes of developing and using satnav systems, developers will consider national and subnational entities at various Administrative Levels, First Level, Second Level, and so forth. Administrative Divisions are grouped into various Administrative Levels which are normally established for the purpose of government. A subnational entity is a portion of a country or political jurisdiction.

Countries are divided up into smaller Administrative Divisions to make managing their land and the affairs of their people easier. For example, a country may be divided into provinces, which in turn are divided into counties, which in turn may be divided in whole or in part into municipalities. The first division of a Country into smaller subnational units, e.g. states in the United States of America or provinces in Canada, is considered to be a First Level Administrative Division. First Level Administrative Divisions are divided into Second Level Administrative Divisions, such as counties or municipalities, which are further sub-divided into Third Level Administrative Divisions such as towns and hamlets.

For the purposes of brevity in this document a Second Level Administrative Division will be referred to as L2AD.

Each country in the world has its own system of naming and creating Administrative Levels. Even the most underdeveloped countries of the world have quite well defined Administrative Divisions. Normally this is a hold-over from when these countries were colonies of more developed nations.

For purposes of explanation a detailed examination of the three countries that make up North America (Canada, United States and Mexico) is shown below. Table 1 summarizes the different naming and division systems for these three countries.

Canada

Canada is divided into ten provinces and three territories.

Each province has a unique system of local government which may include upper-tier or rural jurisdictions such as counties (or Municipal districts), regional municipalities, regional districts or regional county municipalities, and lower-tier or urban jurisdictions such as cities, towns, villages, townships, and parishes. Cities in Quebec are further subdivided into arrondissements ("boroughs").

Statistics Canada of Canada aggregates statistical census data into census divisions, which follow boundaries of one or more large local government units. Municipalities (and in some cases, communities within municipalities) within census divisions may be considered census subdivisions.

United States of America

The 50 states (four of which have the official title of Commonwealth) are subdivided into counties (Louisiana uses the title "parish" and Alaska uses the title "borough"). The counties may be further subdivided into townships, or towns in New York State and most of New England. Urban areas of a state may be organized into incorporated cities, towns, villages, and other types of municipalities, and other autonomous or subordinate public authorities and institutions.

Although the District of Columbia is not a state it is considered a First Level Administrative District.

Mexico

The United Mexican States (Spanish: Estados Unidos Mexicanos) is a federal republic formed by 32 federal entities (Spanish: entidades federativas) (31 states and 1 federal district).

Within the federal states there are approximately 2,400 municipalities and within the federal district of Mexico (this is where Mexico city is located) there are 16 boroughs (delegaciones).

TABLE 1

| | Administrative Divisions | | |
|---|---|---|---|
| Country | Level 1 | Level 2 | Level 3 |
| Canada | 10 provinces 3 territories | Counties Census divisions regions (depending on the province or territory) | Municipalities Parishes County subdivisions (depending on province or territory) |
| United States of America | 50 states 1 federal district (District of Columbia) unincorporated organized territories | 3,000+ counties 40+ independent cities | For purposes of this document Public Use Microdata Areas (PUMAs) and Super-PUMAs will be used as Level 3 Administrative Divisions (L3AD). These are subdivisions of counties created and maintained by the US Census Bureau. PUMAs and Super-PUMAs can be used to divide counties (greater than 1,800,000). There are only 15 counties in USA with a population greater than 1,800,000. |
| Mexico | 31 federal states (estados) Mexico City | 2400+ municipalities (average population of 45,616 16 boroughs | Municipalities are divided into Boroughs (delegaciones) |

TABLE 1-continued

Administrative Divisions

| Country | Level 1 | Level 2 | Level 3 |
|---------|---------|---------|---------|
|         |         | (delegaciones) in Mexico City |  |

Explanation of Geocoding Terminology

In order to explain clearly geocoding, geotagging and the like, it is necessary to establish some clear definitions for the use of such terms in this document. Many of the terms are frequently used in different ways, even by reputable and recognized organizations.

To geocode (verb) is to transform descriptive text into a set of latitude and longitude coordinates. Examples of descriptive texts are:

An Address: Jefferson Building
 600 Delany Street
 Alexandria, Va. 22314-5796
 USA A descriptive location: "the main entrance to the Jefferson Building at the USPTO complex in Alexandria Va."

A geocoder (noun) is a set of inter-related components in the form of operations, algorithms, and data sources that work together to produce a geocode.

A geocode (noun) is a set of latitude and longitude coordinates for an address or other descriptive location. The length of the geocode may vary and the accuracy depends on the number of decimals places.

For example: +38.802133, −77.063371 is the geocode for "the main entrance of the Jefferson Building, part of the USPTO, in Alexandria Va. (example only). The latitude and longitude are given to 6 decimal places, an accuracy of approximately +/−8.5 cm.

The majority of addresses in first world countries have already been geocoded.

A geotag (noun) is a code and corresponding pair of latitude and longitude coordinates that can be used to identify and to locate a point on the earth's surface, typically an address or other textually described location. The code is frequently an alphanumeric string. This string may vary in length depending on the coding method used.

To geotag (verb) is the process of assigning a code and a corresponding pair of latitude and longitude coordinates to a particular location, typically an address or a Point of Interest (e.g. the statue of Liberty in New York City)

A geocode (a latitude and longitude pair) given to 5 decimal places (example: +40.12345) gives an accuracy of about 1 meter at the equator. This is the level of accuracy that is commonly found in the data provided by the major suppliers of maps and geocodes for satnav devices.

A latitude/longitude pair with this level of accuracy requires a minimum of 14 characters and a maximum of 18 characters, depending on where on the globe the point is located. Such large numbers of characters are difficult for humans to work with, prone to errors and are not "user friendly".

CURRENT STATE OF THE ART

Most of the current geotagging methods were developed to be able to geotag any point on the surface of the earth, or at least any point on land, to a certain level of accuracy. Many of these methods use a process of dividing the earth into "square boxes," using a Mercator projection of the earth's surface. Each of the boxes is assigned a unique identifier. In some methods the unique identifiers are then compressed in length using various mathematical processes.

To increase the accuracy of the system the boxes are subdivided into smaller boxes. This method is repeated until the desired degree of accuracy is reached. The accuracy (or resolution) of most methods using this process typically range from a box 1 meter on a side to a box 30 meters on a side.

A box 1 meter on a side results in a geocode of 18 or more characters. Even if the accuracy is limited to, for example, a square 10 meters on a side, and only for land area, there are still 20 trillion 10 meter squares in North America alone. Obviously a large number of characters are required to encode this data. All current geocoding methods suffer from the same weakness from a human user's point of view—the codes require too many characters to geotag a location.

One of the reasons for codes using these other methods are composed of a large number of characters is that these systems allow for every point on the surface of the earth to be geotagged. A house sitting on a ¼ acre lot (1,012 m$^2$) only needs one latitude—longitude pair (a geocode) cross-referenced to its postal address for a satnav device to assist the user in finding the house. Many geocoding systems would "allocate" 1,012 geocodes (one per square meter) to this one address.

Countries such as the United States and the United Kingdom have had very precise geotagging systems for many years. As an example, the United States Postal Service (USPS) has a geotag for every mail delivery point (including, for example, each individual apartment in an apartment building) in the United States and its outlying territories.

Each such geotag consists of a code which is 11 or 12 characters in length and the geocode, the latitude/longitude pairs for the location, typically 16 or 18 characters. This results in a geotag which is 27 to 30 characters long. A geotag of this length is much too long to be used by a normal consumer with a typical satnav device A very similar system exists in the United Kingdom but with an even higher degree of accuracy and thus a geotag of even greater length.

DISCLOSURE OF INVENTION

The present invention provides a method, named the QCODE method, of geotagging all postal addresses and other points of interest that one might want to navigate to and which allows the user to identify these addresses and other points of interest with a code consisting of 6 characters or less. A point of interest may or may not have a street address, for example, "the main entrance to the Jefferson Building at the USPTO complex in Alexandria Va." or "the entrance to the VIP parking area at Yankee Stadium".

This method of geotagging enables any physical location or an actual postal address to be geocoded in only 6 alphanumeric characters or less. A representative example of such a geotag is L6-B4S3 or L6-223, plus the geocode (the latitude/longitude pair) that gives the exact location of the address in question. Please note that the dash (−) shown in the representative geotags is only included to make the geotag more legible. As those skilled in the art are aware, a software program using these geotags may readily remove or add the dash and any other unnecessary characters entered by the user. This would allow the geotags to be displayed in a variety of ways (including dashes and spaces as an example) designed to enhance the legibility of the geotag.

A QCODE geotag is an alphanumeric code. Using the QCODE encoding (or geotagging) process, geotags are assigned to specific locations such as addresses or Points of Interest (POIs). Associated with the geotag is a latitude/longitude pair that identifies the location. Additional information could be associated with the geotag, such as the phone number of the location, other unique identifiers such as a property record identifier, etc. The inclusion of this additional information could be useful in various applications.

A QCODE geotag consists of two parts, a QCODE code and the latitude/longitude pair for the location associated with the code.

For example: A2-CD2H +38.803213, −77.063371 (example only). This would be the QCODE geotag for "the main entrance of the Jefferson Building, part of the USPTO, in Alexandria Va."

Terminology Unique to the QCODE Geotagging Method

The following definition of terminology used in this document is given to make this document more easily understood.

A QCODE geotag consists of four parts, a group code, a region code a location code and an extended location code. The region code and location code are a core code and the group code and extended location code are an ancillary code.

A group code is a three character alphabetic code. Countries are assigned to a group in a logical manner based on the likely use of a satnav device within that area. For example, Canada, USA and Mexico are assigned to the North America group. All countries in Europe are assigned to the Europe group.

The group code is not seen or used by the human user of the geotag. The satnav device determines itself in which group it is located, and then uses the database for that group to look up the QCODE geotag and return the latitude/longitude pair for the desired location.

A region code is a two character alphanumeric code. Within each group, contiguous Second Level Administrative Divisions (for example, in the USA these divisions are for the most part called counties) are grouped together into what are called regions and assigned a unique region code. Regions may include Second Level Administrative Divisions located in different First Level Administrative Divisions. As an example, in the United States, First Level Administrative Divisions are normally States. For example, in the USA, counties from more than one state (a state is a First Level Administrative Division) may be grouped together.

A location code is a four character alphanumeric code. Within each region a unique location code is assigned to each encoded location (address or Point of Interest).

The extended location code is a four character alphanumeric code. It is included in the basic design of the system to allow for future expansion should that be needed or desired.

Referring to FIGS. 2A and 2B, additional detail for the parts of a QCODE geotag are provided. FIG. 2A provides information regarding a preferred embodiment of the 6 character embodiment of this invention. FIG. 2B provides additional detail for a preferred embodiment of the 5 character embodiment.

The Geotagging Method

The geotagging method is a process by which pre-existing geocodes are paired with a unique code (a QCODE geocode) to form a QCODE geotag.

The code is typically, but not limited to, six alphanumeric characters.

A QCODE code can be assigned to more than one geocode. In other words, the QCODE code can be re-used. When a QCODE code is reused it is done in such a way that has no adverse effects on its use with satellite navigation devices used under normal circumstances.

These geotags have been specifically designed for, but are not limited to, use in consumer navigation devices.

Use of these geotags requires the use of a database that contains of all geotags for the region of the world in which it is used. When a QCODE code is entered into, for example, a consumer satellite navigation device, the device does a "look-up" in the database to find the latitude/longitude coordinates (the geocode) associated with that code. The satnav device then knows the coordinates of the desired destination and can plot a path accordingly.

The QCODE geotagging method assigns to pre-existing geocodes a geotag that consists of two elements, a QCODE code and the pre-existing latitude and longitude coordinates of the address or location.

The standard QCODE geotagging method can produce geotags that have a QCODE code of only 6 characters (or less) because it makes use of two key factors.

One key factor is that the QCODE geotagging method makes use of the ability of a satnav device to calculate where it is located on the face of the earth. Using this factor allows the QCODE geotagging method to "re-use" codes geotags. For example, the code geotag, AB-CDEF, could be used in the North America group, the Europe group, and other groups as well.

If the user of a satnav system is (for example) located somewhere in North America, and enters a QCODE code into a satnav device, the device is programmed to assume that the desired location is also located somewhere in North America and uses the database for North America to retrieve the geocode (the latitude/longitude pair) for the address associated with the code entered. The database for other groups, such as Europe or Australia are not used since it would be highly unlikely that the desired destination is located on another continent (and thus in a different group).

The software of the satnav device is designed such that after the code is entered and an address is retrieved by the device, the address is presented to the user for final confirmation that the desired address has been retrieved.

Thus the QCODE geotagging method allows for several different locations and addresses to have the same code. For example: the QCODE geotag L2-AD34 may refer to and give the latitude and longitude coordinates for four different locations, for example: a location in North America, Europe, the Middle East or Australia.

Using the QCODE method of geotagging, each of these large areas would be considered to be part of a separate or different group. It is assumed that the user of a satnav device who uses a QCODE geotags would never expect the device to give him/her driving direction from South Africa to the UK. Therefore addresses located within the user's current geographic group would be selected preferentially.

The second key factor of the QCODE geotagging method is that it requires a database of only those locations that contain an actual address or Point of Interest. Other geocoding systems have been designed such that a device using their codes and the correct software, can "decode" the code into a set of latitude and longitude coordinates (a geocode). This design results in codes used for geotagging that are much longer than a QCODE code because those geotagging system must be able to create a code for any point on the face of the earth, regardless of whether or not there is an address or Point of Interest at that particular point.

The QCODE method of geocoding only encodes addresses and other specific points such as points of interest. This method does not encode locations that do not have a navigable significance, for example, locations in the middle of a lake or ocean.

In a densely populated area like Manhattan in New York City the plot of land for a particular address may be 20 meters by 400 meters, a total of 8,000 square meters. Even geocoding systems that only geocode to a resolution of a square 10 meters on a side would allocate 80 codes to this one address.

Only one geocode is needed to identify the address, the other 79 codes are superfluous.

However if there were 50 apartments within the building at this address, the QCODE geotagging method has the capacity within the 6 character limit to create unique geotags for each of the 50 apartments should that be desired.

The complete QCODE geotag database may be stored locally (e.g. in the memory of a satnav system) or remotely (e.g. on a centralized database server, such as a Google server).

For systems that may not store the database locally, such as some smartphone GPS navigation systems, a user may input the code of his desired destination. The smartphone then transmits a data packet to a remote server (i.e. a Google server). This data packet need only contain two items of information: the code entered, and the code (a maximum of three characters) for the group (as determined by the QCODE geocoding method) where the smartphone is located.

With this information the remote server performs a lookup in the database of QCODE geotags for the geographical group (for example, North America) where the smartphone is located and then transmits back to the smartphone the geotag (a latitude/longitude pair up to a maximum of 18 characters (assuming a 5 decimal place/one meter accuracy)). This is a very small packet of data and thus very cost effective. The smartphone software then calculates directions to the desired location in the same way as if the user had actually entered the latitude/longitude coordinates themselves.

Ensuring an Adequate Quantity of QCODE Codes

A six character alpha-numeric string (26 alphabetic characters and ten numbers for a total of 36 characters) yields approximately 2.2 billion permutations (36 to the 6th power). This number is far larger than the number of addresses that need to be assigned a code within any particular group and accordingly all addresses located within an area represented by a particular group can be assigned a unique geotag.

The population of the USA is approximately 314 million. The US Postal Service delivers mail to approximately 150 million different addresses. This number includes all of the addresses that may be contained within one street address (called delivery points by the US Postal Service), as is the case with multiple unit dwellings such as apartment buildings. This is a ratio of approximately one address for every two inhabitants. The same ratio of inhabitants per address (one address for every two inhabitants) is true of the United Kingdom, the city of London, England, Germany, and the vast majority of geographic entities in the developed world.

In the less developed parts of the world it is expected that the number of addresses per person would be even lower. Many people in the less developed parts of the world live in places that have no named roads, house numbers, etc.

Satnav systems are just beginning to be used to locate points within large buildings such as a shopping mall or airport. The QCODE system has enough expansion capability to accommodate this increase in "addresses."

Zipf's Law or the rank-size distribution rule (or law) describes the remarkable regularity in many phenomena including, as it applies to this invention, the distribution of the populations of an area. If one ranks the population size of a given country or the population of other made-made divisions such as counties or cities, and calculate the natural logarithm of the rank and of the population of the division, the resulting graph will show a remarkable log-linear pattern. This is the rank-size distribution rule.

In the case of the distribution of populations, the resulting distribution in a country, region group or the whole world will be characterized by a single large division, with other divisions decreasing in size respective to it, initially at a rapid rate and then more slowly. This results in a few large divisions and a much larger number of divisions orders of magnitude smaller. Although the rank size distribution does not strictly follow Zipf's Law it follows it closely enough to insure that the available number of QCODE geotags will be able to easily encode all of the addresses within a group, or country, continent or any other division.

The research shows that in the developed world there is approximately one address for every two inhabitants of the chosen division. This, combined with the "rank size distribution rule" insures the QCODE geotagging method will always have sufficient permutations to be able to assign a unique QCODE geotag to every address within any specific geographic area.

Advantages of QCODE Geotagging Method

The QCODE geotagging method marks a distinct advancement beyond other geotagging systems. The QCODE geotagging method requires only 6 characters to geotag all addresses on the earth, where other systems require more than 6 characters. Furthermore the accuracy of the this method of geotagging is only limited by the accuracy provided by the GPS system. Other systems require additional characters to geotag to higher degrees of location accuracy.

Another novel feature of the QCODE method of geotagging is that the degree of accuracy of the geotag is not dependent on the number of characters in the geotag. It is only dependent on the accuracy of the associated geocode (the latitude/longitude pair) that is part of the geotag.

The United States is in the process of upgrading its GPS system, one of the results of which will be an increased accuracy/resolution of less than 1 meter.

The European Union is in the process of developing a satellite navigation system (called Galileo) which will also have an accuracy of approximately 1 meter.

With other geotagging methods a completely new geotag would be required to make use of this increased accuracy when it becomes available. The QCODE geotagging method would require no such change to the code, just an upgrade to the database of geocodes (latitude/longitude pairs) associated to the QCODE code. The code for the address would remain unchanged.

Another advantage of this method of geotagging is that geocodes of different degrees of accuracy (example: some to +/−3 meter accuracy, other to +/−1 meter accuracy) can be used without changing the number of characters in the. It is much preferred that all codes be of the same number of characters. The user and any software used in the system then know how many characters to expect when receiving/retrieving a code.

Administrative Levels for North America

The North American group is used as an example to show and explain the use of Administrative Levels in assigning codes to addresses.

Referring again to Table 1, the naming and division systems describing the various Administrative Levels for Canada, the United States of America, and Mexico are provided. The boundaries of all of these Administrative Levels may change from time to time. The QCODE geotagging method has been developed with an ability to easily cope with these changes In preferred embodiments of the present invention, during the initial encoding of addresses, a specific database may be used and the boundaries of all Administrative Levels may be fixed which may allow for the initial assignment of a code to an address. If in the future the boundaries of a Level 2, 3, or 4 Administrative Division change, any new addresses located within the new boundaries may be encoded without requiring any change to the geotags assigned to any previous addresses.

As an example, in the USA, during the initial encoding process, all addresses in County ALPHA, may be assigned the region code "AL." Addresses located within that county would be assigned codes such as: AL-AWER, AL-ERTY, AL-CDFG, AL-23SA, etc. All addresses in County BETA may be assigned the region code "BE" and individual locations/addresses would be assigned codes such as BE-CVBN, BE-4567, and the like.

Assume (for example) the boundaries of country ALPHA and BETA change. Some addresses that previously were in County ALPHA are now in County BETA because of boundary changes, and vice versa. No changes will need to be made to the geotags for addresses that were encoded prior to the boundary change.

When a new address needs to be encoded (e.g., a new house is built) in an area that was previously located in county ALPHA but is now in county BETA because of boundary changes, it may be encoded following the same rules as before, that rule being, all addresses in county BETA are assigned a geotag with a region code (the first two characters) beginning with BE. It would be assigned to the appropriate region code for the county in which it is located.

This could result in two addresses located physically next to each other having different region codes (example AL-XXXX and BE-XXXX), but this in no way effects the operation or usefulness of the QCODE method of encoding addresses.

Capacity for Expansion

The QCODE geotagging method allows for any foreseeable expansion of new addresses or POIs.

The maps used in a satnav system include Points of Interest (POIs) that do not have an address. Examples of such a POI could include a particular rest-stop along a motorway or the entry point to a national park. It has been estimated by Garmin that their maps of North America (supplied by NAVTEQ) contain 6 million POIs. Even if all of these POIs did not have a "postal address" (and thus had already been assigned a code) there are still enough permutations with six characters to assign a unique QCODE geotag to each POI.

For example, in one embodiment of this invention, only 32 characters are used (instead of the available 36). The characters and numbers 1, 0, I and O are not used to reduce possible transcribing errors.

With 32 characters there are approximately 1.07 billion permutations available. The total population of the North America group (Canada, USA and Mexico) is approximately 445 million. This means that there are approximately 222 million addresses in the group. Note: one street address (123 Main Street) that may be an apartment building with 100 apartments is counted as 100 different addresses.

Therefore, only 222 million of the 1.07 billion permutations (approximately 21 percent) would be needed to encode all of the addresses. This leaves a significant number of un-assigned permutations to be assigned to Points of Interest and new addresses as they occur.

BRIEF DESCRIPTION OF FIGURES

FIG. 8 depicts a representative example of various exemplary geotags.

FIG. 12 depicts representative examples of displaying exemplary geotags.

BEST MODE FOR CARRYING OUT THE INVENTION

Figure 1:
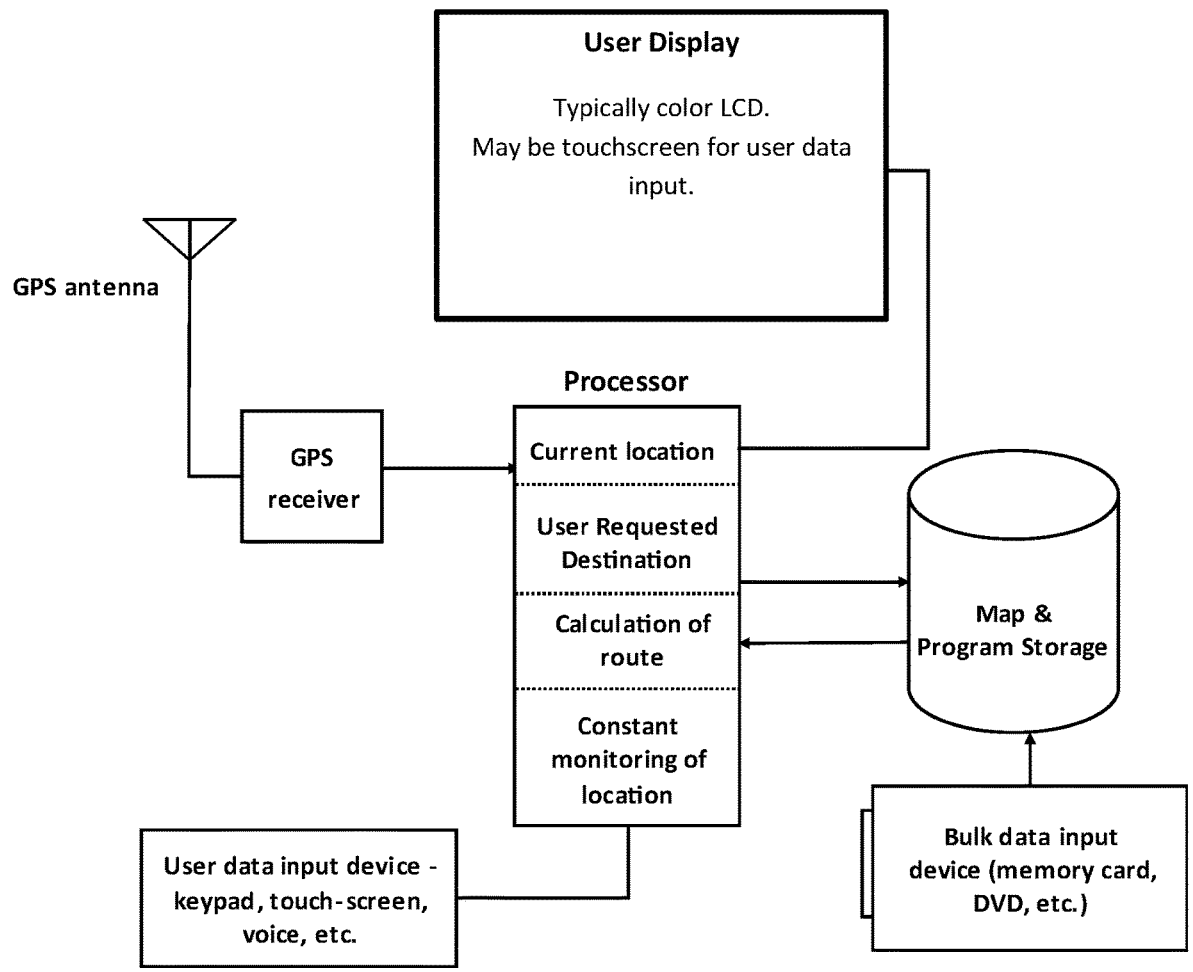
FIG. 1 depicts a simplified block diagram of a satnav system.

FIG. 1 depicts the components of a typical satnav system. A typical satnav device has a user display, a processor to run software which operates the satnav device, a user data input device such as an touchscreen keypad, a bulk data input device such as a memory card, map and program storage comprising read only memory (ROM) for the software running the satnav system and random access memory (RAM) to store user entered data and working data, a power supply (not depicted) which may be an internal battery or an external power source such as an automotive electrical system, and a GPS receiver which receives location information from a GPS satellite network (not depicted) via a GPS antenna. The satnav device could be a personal GPS system, or an application that runs on a smartphone, tablet, or other like device.

When the GPS receiver is activated, the GPS receiver receives radio signals via the GPS antenna. This allows the GPS Receiver to determine where it is on the surface of the earth. Therefore the satnav device always knows where it is. The user display of the satnav device is used to ask for user inputs (such as desired destination) and provide user with maps to assist in following the instructions created by the device to guide the user to their desired destination.

The satnav device has non-volatile storage which is used to store the software to operate the device, maps in an electronic format and the database of addresses that relate to the maps. Typically, once a destination address is entered the software does a "look-up" in the database to find the latitude and longitude of the desired destination. In a satnav device using QCODE geotags the lookup is done on a table that contains all pertinent codes and the latitude and longitude associated with each code.

The satnav device typically will have some sort of bulk data input capability, e.g. a memory stick or a SD memory card similar to those used in smartphones or digital cameras. This is used to load updated maps, software, QCODE geotags, etc. into the map and program device.

All satnav devices have a method for the user to input data via the user input device. This may be a keyboard on a touch-screen display, or other such device, which is used by the user to input data, such as the desired destination.

The processor of the satnav device receives the data input from the user, looks up the address in the map/address database to find desired destination (in latitude and longitude) and then calculates a route. When the satnav device is used in a vehicle, as the user's vehicle progresses along the route the processor displays constantly updates information (data and maps of current surrounding area) to assist the user in following the directions to the desired destination.

Various embodiments of the present invention provide a method, hereafter referred to as the QCODE method of geotagging, to encode all addresses or other points of interest that a user might want to navigate to with a code designed such that the user may enter a code consisting of only 6 characters or less into a satnav navigation system and the satnav navigation system can identify the unique location corresponding to the code entered.

Figure 2A:
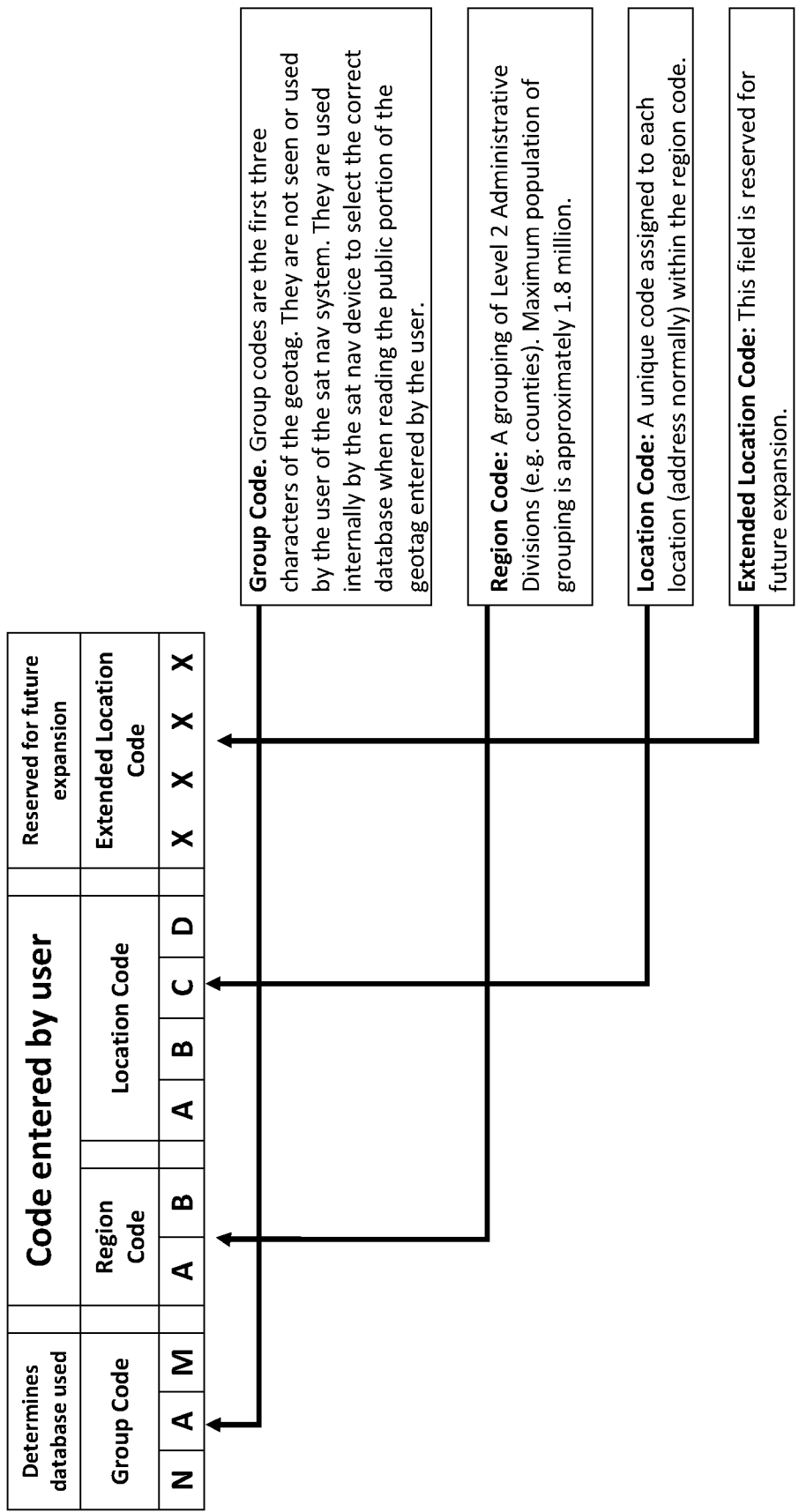
FIG. 2A depicts a representative example of an exemplary 6 character geotag.

Referring to FIG. 2A and the preferred embodiment depicted therein, a representative example of an exemplary code is shown.

A code is comprised of three parts:
a group code comprised of three alphanumeric character (s);
a region code comprised of two alphanumeric characters; and
a location code comprised of four alphanumeric characters.

A code may also comprise an extended location code comprised of four alphanumeric characters.

In the preferred embodiment, the characters in a standard code (5 or 6 character set) are limited to the characters in the base character set. The base character set contains (a) all uppercase letters in the English alphabet excluding "O" and "I" and (b) the numbers 2 through 9. The numbers 0 and 1 are removed to prevent confusion with O and I from the alphabet. There are a total of 32 characters in the base character set. Hereafter alphabetic characters will be referred to as letters and numeric characters as numbers.

It should be readily apparent that other character sets, such as the full English alphabet and numbers 0 through 9, such as letters from the Cyrillic alphabet, Cantonese characters, computer generated symbols, and the like may be used individually or in combination with other character sets including the base character set to accomplish the present invention without avoiding the teachings of the present invention.

A user of the code need only enter six characters into a satnav system to identify a desired address. The six character code entered by the user is comprised of two characters of the region code and the four characters of the location code.

The 3 characters of the group code are not known to the user and the user does not have to enter them. The satnav device knows where it is located and therefore can append the appropriate group code to the characters entered by the user.

The preferred method to create and use the group code, a region code, and location code will be described herewith.

Figure 2B:
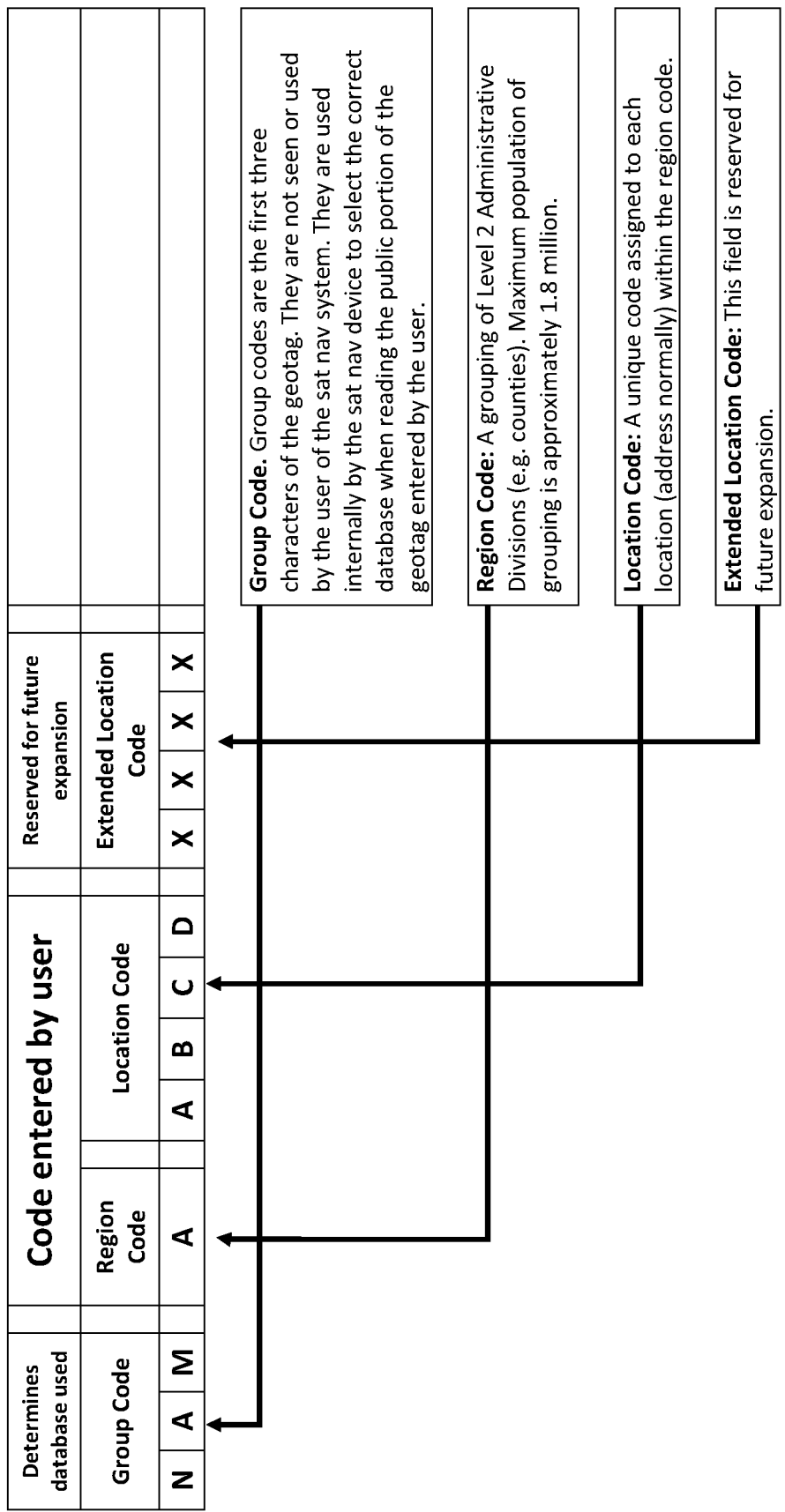
FIG. 2B depicts a representative example of an exemplary 5 character geotag.

Referring to FIG. 2B, a representative example of the 5 character embodiment is depicted.

In this embodiment the region code is only one character.
Creation of Group Codes The group code is one of the key features of described geotagging method. Group codes are used to group countries into logical groups and thus allow the re-use of the region codes and location codes which allows all addresses in the world to be encoded with only 6 characters.

In a preferred embodiment of the present invention, the group code is comprised of the alphabetic characters of the base character set.

The logic behind the grouping of countries into groups and assigning group codes is that it would not be logical for a user of a satnav system to be, for example, located in the North America group and want to receive a set of directions guiding him to a destination located in Europe, or any of the other groups of countries. Group codes may follow the groupings used by the suppliers of the maps for satnav systems. In the preferred embodiment of the present invention, group codes are the first three characters of the complete code. However, the group codes are not seen or used by the user of the satnav system. The group codes are used internally by the satnav device to select the correct database when processing the region code and location code of the code entered by the user.

A group code is assigned to each geographical group of countries whose maps are used by the typical satnav system. Typically maps can be grouped into "continents" that are the same as those used by manufactures of satnav systems. For example, USA, Canada, and Mexico may be grouped together and assigned the group code NAM—the group code assigned to "North America." This is the grouping used by both Garmin (using maps provided by NAVTEQ of Chicago, Ill.) and TomTom (using TeleAtlas maps).

Group code EUR may be assigned to the group of countries whose maps are called Europe by the satnav manufacturers.

For example: an address in North America may have a code of NAM-CA-2234. And address in Europe may have a code of EUR-CA-2234. The region and location codes of the code (CA-2234) are identical for the two addresses, but the group codes are different and thus the addresses are different. When a user inputs the code CA-2234 the satnav device must know which address is the desired destination, the address in North America or the address in Europe. If the satnav device is located in North America then the address associated with code NAM-CA-2234 will be used. If the satnav device is located in Europe then the address associated with code EUR-CA-2234 will be used.

A further example of group codes will be provided presently.

In one preferred embodiment of the present invention group code NAM includes all addresses located in North America, including Canada, Mexico, USA, excluding Hawaii, and several Caribbean islands;

Group code EUR includes all of the countries of Europe, including Turkey but excluding Russia;

Island nations (Japan, Australia, New Zealand, and the like) each may receive their own separate group codes since one cannot logically be expected to drive (or walk) from one of these areas to another;

This gives the island countries the advantage of having the full number of region codes (768 in the 6 character embodiment) to be used to encode their addresses. Certain groups of island nations (the islands in the Caribbean) may also be given their own group code.

The People's Republic of China (China) and India both have populations that exceed 1 billion. This means that the number of addresses in these two countries may exceed the number of addresses that can be encoded within one group code. Thus it could be required to split these countries into two groups.

In reality, although both India and China have populations exceeding 1 billion, the number of addresses will be significantly less than the "one address per two inhabitants" guideline used for developed countries. In both India and China many people live in houses that do not have addresses.

The same is true for other areas of the world. In Africa, only 28% of the population lives in a building with an addresses according to the 2010 report of the Universal Postal Union.

Table 2 details a sampling of an overall picture of how the countries of the world are grouped into different groups and given unique group codes.

TABLE 2

| Group Code | Region | Country | Population thousands | Number of Addresses |
|---|---|---|---|---|
| CAN | China | China A | 700,000 | 350,000 |
| EUR | Europe | Multiple | 664,517 | 332,258 |
| CNB | China | China B | 600,000 | 300,000 |
| INA | India | India-A | 600,000 | 300,000 |
| INB | India | India-B | 600,000 | 300,000 |
| EAS | Eastern Asia | Multiple | 572,500 | 286,250 |
| CEA | Central Asia | Multiple | 529,192 | 264,596 |
| NAM | Northern America | Multiple | 445,366 | 222,683 |
| SAM | Central & South America | Multiple | 424,425 | 212,213 |
| RUS | Russia | Russian Federation | 142,499 | 71,249 |
| WEA | Western Asia | Multiple | 137,371 | 68,686 |
| JAP | Japan | Japan | 127,967 | 63,983 |
| SAF | Southern Africa | Multiple | 55,682 | 27,841 |
| KOR | South Korea | Republic of Korea | 48,224 | 24,112 |
| CAR | Latin America & Caribbean | Multiple | 41,246 | 20,623 |
| PKR | North Korea | Dem. People's Republic of Korea | 23,790 | 11,895 |
| TWN | Taiwan | Taiwan | 23,071 | 11,536 |
| AUS | Australia | Australia | 20,743 | 10,372 |
| OCE | Oceania | Multiple | 9,345 | 4,673 |
| ISR | Israel | Israel | 6,928 | 3,464 |
| NZL | New Zealand | New Zealand | 4,179 | 2,089 |
| | | Grand Total | 6,663,265 | 3,331,632 |

Creation of Region Codes

Referring again to FIG. 2A and the preferred embodiment depicted therein, a region code is depicted. The region code is comprised of two characters, the first of which is a letter from the base character set and the second of which is a letter or a number from the base character set. The total number of permutations for a region codes in the 6 character embodiment would thus be 768 (24×32=768). As will be readily apparent to those skilled in the art, other combinations of letters, numbers, and symbols may be used without deviating from the teaching of the present invention.

In another embodiment, region codes could begin with numbers, allowing the encoding of additional addresses if needed.

In the present embodiment with the six character code, each region code has 1,048,576 unique location codes available (32×32×32×32=1,048,576).

In yet another embodiment, region codes could be comprised of a 36 character set comprising the letters of the English alphabet and the numbers from 0 through 9 inclusive.

Assuming a ratio of one address per two inhabitants, one region code with 1,048,576 permutations can encode all of the addresses within an area with a population up to approximately 2 million. To allow for future growth of addresses and that the number of addresses will not equate exactly to 50 percent of the population, in the 6 character embodiment the allocation process will assign a maximum of 900,000 addresses, which equate to a population of 1.8 million, to any single region code.

Within each group region codes will be allocated to each "major administrative area." As a representative example, the North America group (USA, Canada, and Mexico) region codes will be allocated to:

For USA
  with 1 region code allocated to the USA as a whole, e.g. US-XXXX
  and 1 region code reserved for each of 50 states, except Hawaii (Hawaii will be in its own group), plus District of Columbia for a total of 50; in the present embodiment, the two character codes assigned by the US Postal Service (USPS) to each state will be used
  and additional region codes as needed to code all addresses;

For Mexico
  with 1 region code allocated to Mexico as a whole MX-XXXX
  and 1 region code for each Federal State
  with additional region codes as needed to code all addresses within each Federal State;

For Canada
  with 1 region code allocated to Canada as a whole CN-XXXX
  and 1 region code allocated to each province and territory
  with additional region codes as needed to encode all of the addresses in Canada, estimated to be approximately 16 million.

Grouping Addresses into Cantons

In cases where the population of a Level 2 Administrative Division (for example a county in the USA) is less than about 1.8 million, that Level 2 Administrative Division will be grouped with adjacent contiguous Level 2 Administrative Divisions so that the total population of the total group is as close as possible to the limit of about 1.8 million. These groups will be called cantons.

The groupings may be based on either man-made Level 2 Administrative Divisions, such as a grouping of counties within a particular state in the USA or upon naturally occurring groups of Level 2 Administrative Divisions such as a grouping of counties along the Delaware Peninsula bordering the Chesapeake Bay and encompassing counties in three different states (Delaware, Maryland, and Virginia).

The maximum number of addresses allowed for a particular region code will be about 900,000. Limiting the number of addresses in the same region code to 900,000 ensures that there are enough permutations of the four characters of the location code to encode all of the addresses that will be found within the boundaries of the region code and to allow for a growth of addresses and points of interest within the region code.

The region code may also contain addresses located in multiple countries (for example addresses located in Belgium and the Netherlands, or Canada and USA).

In the preferred embodiment, as a general guideline region codes are allowed to cross country borders when regular travel from one country to the other is normal and expected.

Method for the Assigning of Region Codes

Figure 3:
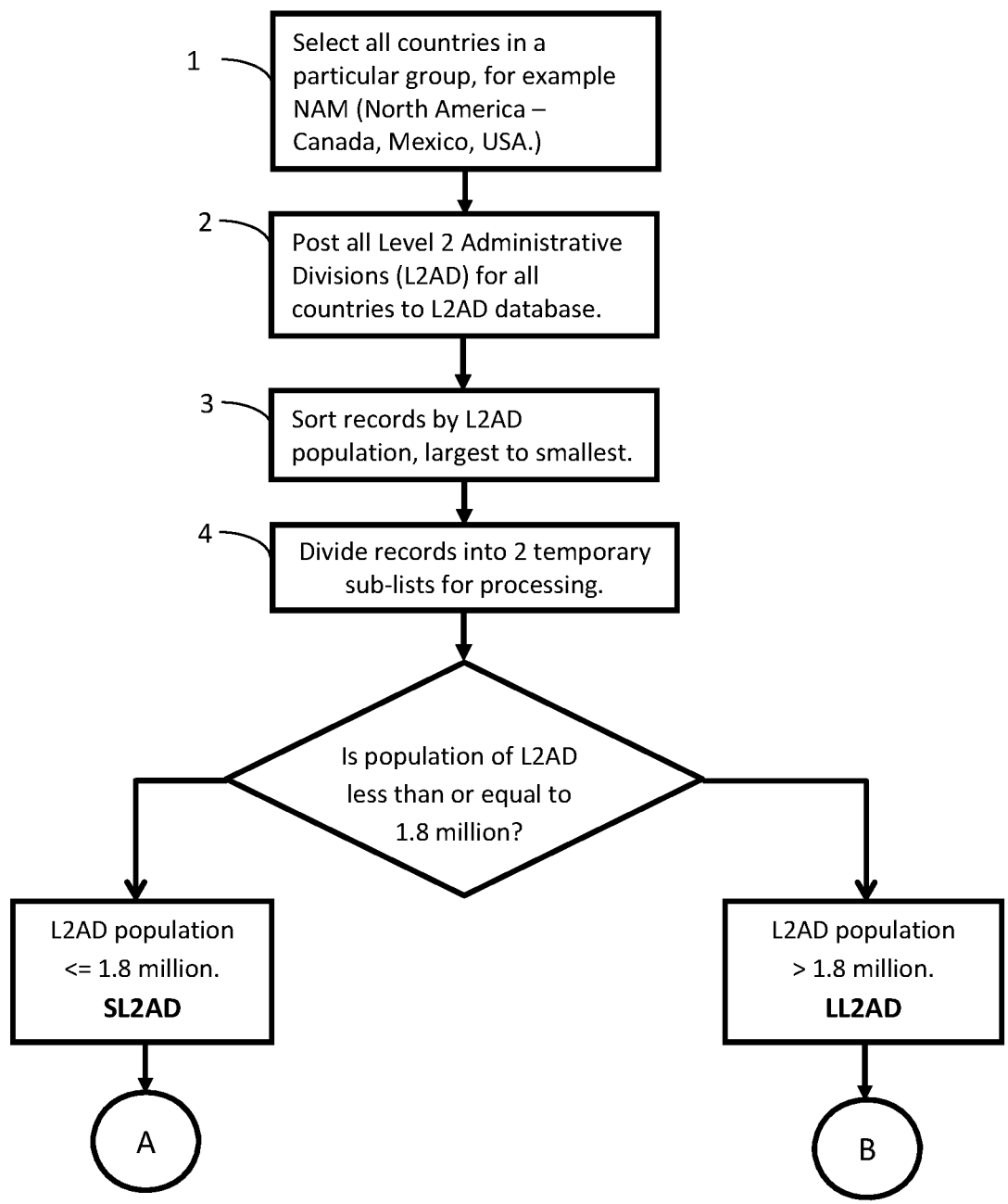
FIG. 3 depicts a flow chart for assigning a region code to an address.
Figure 4A:
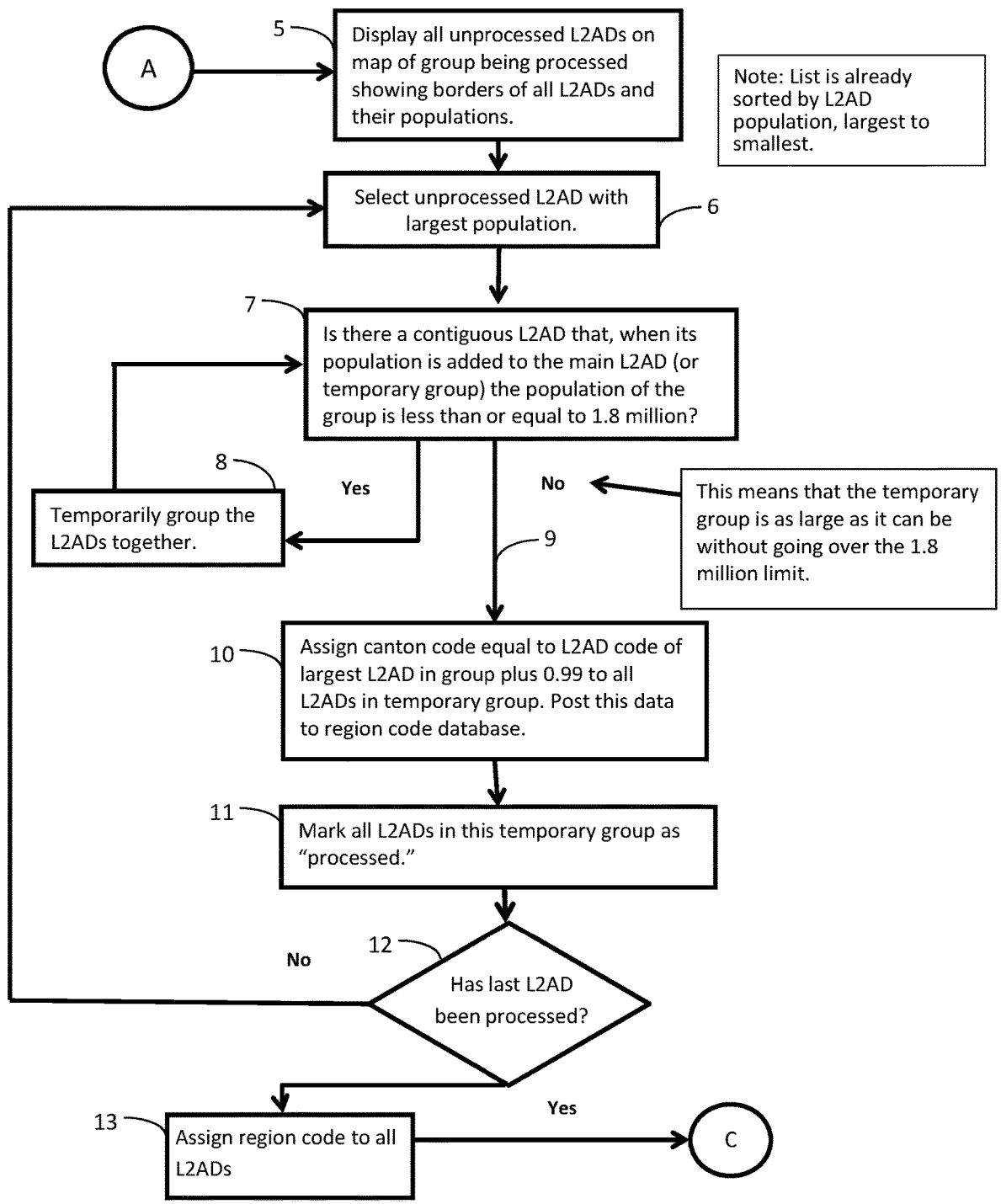
FIG. 4A depicts a flow chart for processing small L2ADs.
Figure 4B:
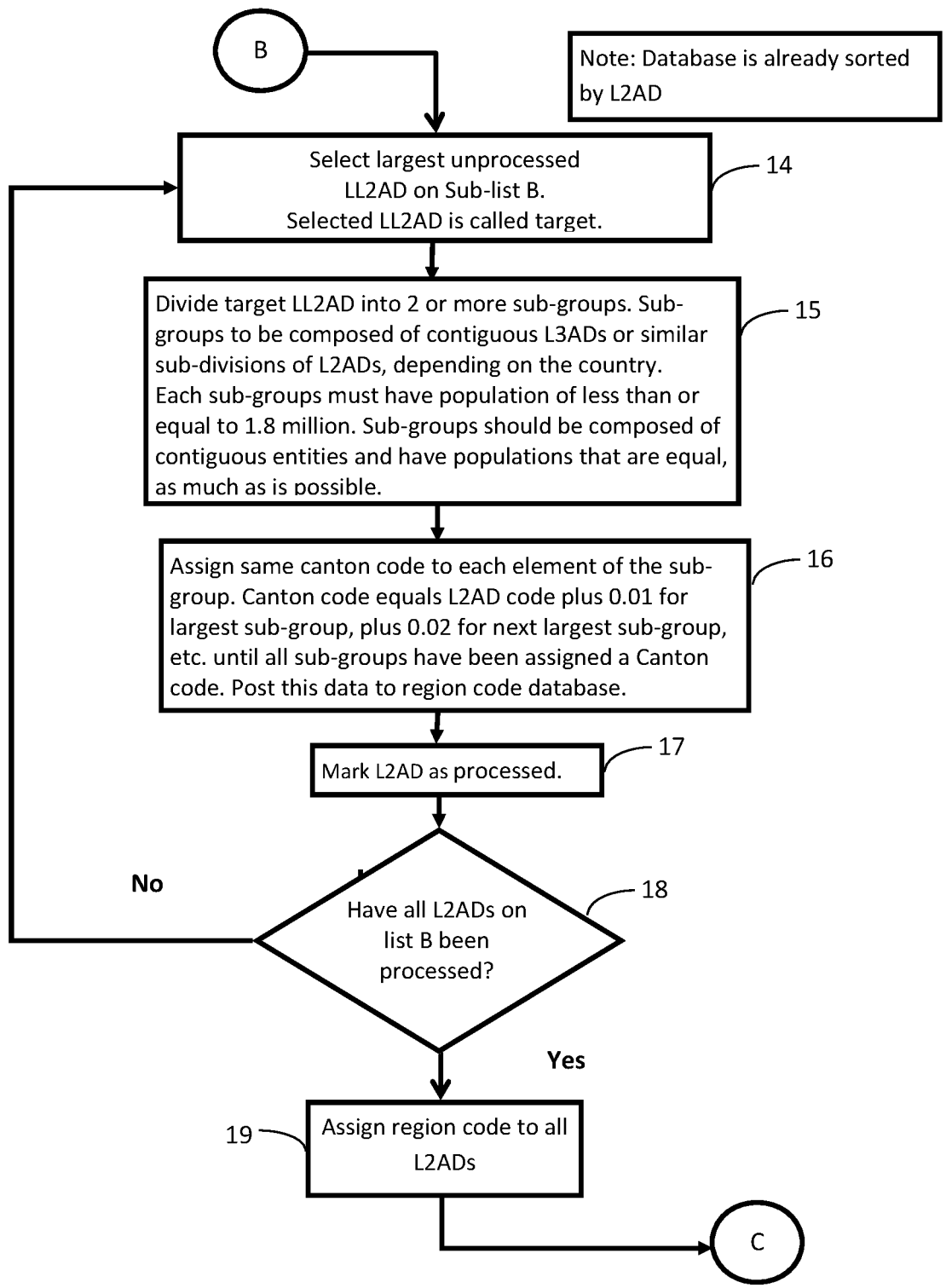
FIG. 4B depicts a flow chart for processing large L2ADs.

FIGS. 3, 4A, and 4B present a flow chart of one preferred embodiment of the present invention for assigning region codes to groups of addresses. Referring to FIG. 3, in Step 1, the countries within the particular group are identified. In Step 2, the Level 2 Administrative Divisions (L2ADs) for all countries are identified and the population of each is entered into a database. In Step 3, the records of the L2AD database are sorted by population, largest to smallest. In step 4, the records in the database are divided into two lists; the first list contains the L2ADs and their corresponding populations where the L2AD population is less than or equal to 1,800,000. The L2ADs on the first list are considered to be small L2ADs (SL2ADs). The second list contains the L2ADs and their corresponding populations if the L2AD population is greater than 1,800,000. The L2AD's on the second list are considered to be large L2ADs (LL2ADs). For SL2ADs in the first list, proceed on to Step 5 on FIG. 4A.

Referring to FIG. 4A, in Step 5, the SL2ADs are displayed on a map. The map will graphically represent each L2AD and will be annotated with each L2AD population. In Step 6 the largest (by population) unprocessed SL2AD is selected. The SL2ADs that have not been selected for processing via the procedure described in Step 6 are considered to be unprocessed and are identified as such. The SL2AD selected to be processed will be referred to as the target L2AD and be included in a group referred to as the target group in subsequent processing steps.

In Step 7, if there is at least one SL2AD contiguous to the target, each SL2AD contiguous to the target is listed and sorted by population largest to smallest. The list of SL2ADs contiguous to the target L2AD is reviewed and sorted, largest to smallest, to facilitate the determination of whether contiguous SL2AD can be added to the target L2AD's population and not exceed a population of 1,800,000.

In Step 8, if there is a contiguous SL2AD whose population may be added to the target L2AD's population and not exceed 1,800,000 then that contiguous SL2AD is grouped with the target L2AD and this new group becomes the target group, now consisting of two L2ADs.

Step 7 is repeated until there are no additional contiguous SL2ADs that may be added to the target without having a combined population exceeding about 1,800,000.

In Step 9, the result of Step 7 is negative, therefore proceed to Step 10.

In Step 10, a canton code is assigned to each SL2AD comprising the target group. This canton code is added to all addresses in the address list that are located in the L2AD's that comprise the canton.

The following procedure is used to assign canton codes to the target group. The canton code is assigned to facilitate data processing on addresses.

Select the largest SL2AD in the target group. As those skilled in the art are aware, local authorities assign codes (names) to geographic areas within their borders; depending upon the size of the geographic area these codes identify L2ADs or L3ADs. For simplicity, these assigned codes may be assigned to the SL2ADs and a numeric suffix (e.g. "0.99") may be appended to the assigned code. For example: if code is ABCD then new code will be ABCD.99. This new code is the canton code for the SL2AD. This same code may also be assigned to all of the SL2ADs in the target group.

In Step 11 all SL2ADs included in the target are considered to have been processed and are identified as such.

In Step 12, if there are still unprocessed SL2ADs then Step 6 is repeated.

In Step 13, each SL2AD is assigned a region code. All SL2ADs with the same canton code are assigned the same region code. SL2ADs with same canton code were grouped together in Steps 6, 7, and 8 and thus should be assigned the same region code. All available region codes are included in a region code list, where the region code list contains all permutations of two characters of the base character set for a total of 1,024 available region codes. When all SL2ADs have been processed (assigned region codes), then location codes may be assigned to the individual addresses within the L2ADs that make up the target group.

Referring again to Step 4 in FIG. 3, after all SL2ADs have been assigned a region code, then any LL2ADs will be assigned to sub-list B and processed as shown in Step 14 of FIG. 4B.

In Step 14, the largest unprocessed LL2AD will be selected. This LL2AD will be referred to as the target in the following steps.

In Step 15 the target LL2AD is processed. As all LL2AD in sub-list B have a population greater than about 1.8 million, each LL2ADs must be sub-divided into parts, each part with a maximum population less than about 1.8 million. In the preferred embodiment, division will be along divisions previously created by local authorities such as US Census Bureau, Statistics Canada, UK Office of National Statistics, Statistisches Bundesamt Deutschland, etc.

As will be readily apparent to those skilled in the art, divisions may be made along other criteria.

It is preferable that the sub-groups used for division of L2ADs with a population greater than 1.8 million be composed of contiguous L3ADs and that the populations of the sub-groups be as equal as possible.

In Step 16 a canton code is assigned to each element of the sub-group. As those skilled in the art are aware, local authorities assign codes (names) to geographic areas within their borders; depending upon the size of the geographic area these codes identify L2ADs or L3ADs. To assign canton codes; it is preferable to start with the sub-group with the largest population; this subgroup may be concatenated with the suffix "0.01" to the code assigned to the LL2AD by local authorities (called the base code) and assign this code to all elements of the sub-group. This code will then be the canton code for all elements of the sub-group.

It is preferable to assign each element of the sub-group with the next largest population a code equal to the base code with "0.02" concantinated. This process may be repeated until all sub-groups of the target LL2AD have been assigned canton codes. As those skilled in the art are aware, other codes or symbols may be used to differentiate between cantons without deviating from the spirit of the invention; numeric incrimination was chosen as an example for its simplicity.

In Step 17, the processed LL2AD is marked in the database as "processed."

All addresses located within a particular L3AD will be assigned the same region code.

In the embodiments described here, region codes will be assigned to cantons manually. This will allow the assigning of region codes that, where possible, have some sort of pneumonic link to the common name for the area/areas are assigned to all addresses within a canton. For example, the region code for addresses in Brussels Belgium could be "BR."

In Step 18 a check is made to see if there are any LL2ADs still to be processed. If there are unprocessed LL2ADs, return to Step 14. If there are no remaining unprocessed LL2ADs, proceed to Step 19

In Step 19, region codes are assigned to all LL2ADs that have been processed.

Figure 5:
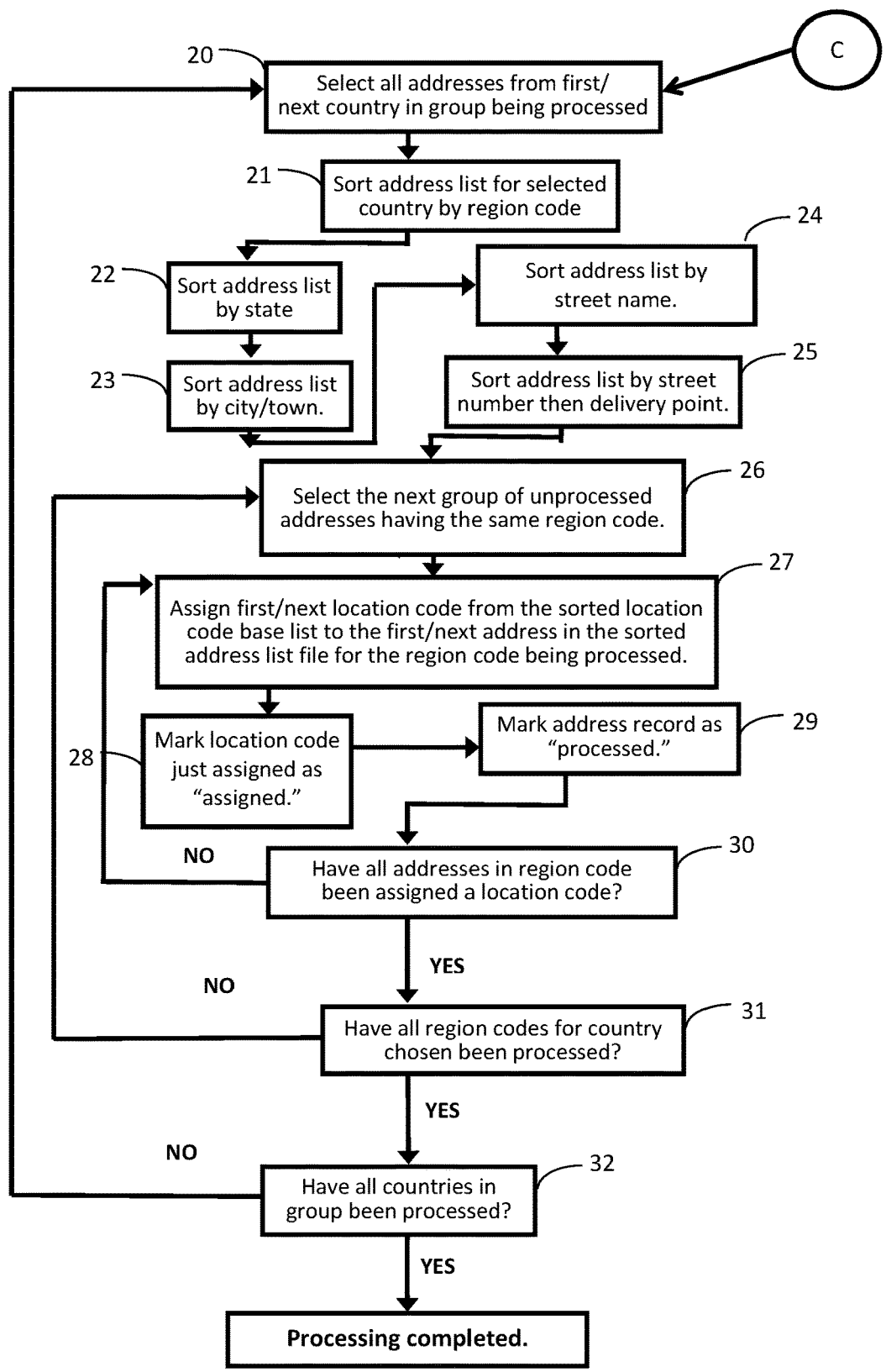
FIG. 5 depicts a flow chart for assigning location codes.

After region codes have been assigned, proceed to Step 20 of FIG. 5. In Step 20, location codes may be assigned to the targets.

In the preferred embodiment the region codes beginning with numbers are not used except when there are not enough available region codes in a particular group to allow for all region codes to start with a letter. This is accomplished by sorting the region code base list from A to Z, 2 to 9. Thus region codes beginning with numbers are sorted to the bottom of the list. Region codes are allocated starting from the top of the list. Therefore, the bulk of region codes will begin with a letter and it will be rare for region codes to begin with a number.

Assigning Region Codes to Cantons

Once cantons have been created for all areas of a geographical group (e.g. North America), and canton codes assigned, a region codes must be assigned to each canton. This can be done by randomly assigning the available permutations of the two character region code. However, in the preferred embodiments the region code assigned to a canton will have a pneumonic significance if possible. Example: a canton comprising the two counties of Buffalo and Smith in New York State may be assigned a region code of BU, as a shortened version of Buffalo.

The assigning of a region codes to cantons in the preferred embodiments is preferably performed manually, which allows for a human to make judgments about the region code to be assigned.

Merging the Region Code Database with the Address List Database.

Before location codes can be assigned to the addresses in the address list, each address must have a region code assigned to it. Region codes are assigned to each address in the address list by merging a region code database with the address list database or by using a "lookup" database command. Doing this is a well know procedure for anyone skilled in the art.

Once this merging has been done each address in the address list will have had a region code assigned to it. All addresses located within the same canton will have the same region code. Each canton will be assigned a unique region code.

Cantons have been created in a manner that results in the total population within a particular canton being approximately 1.8 million. As a result of the "one address per a population of two" each canton will have approximately 900,000 addresses. Therefore since each canton is assigned a unique region code, there will be approximately 900,000 addresses in each region code grouping.

Preparation of Location Code Base List

In the preferred embodiment of the present invention depicted in FIG. 2A, the location code is composed of 4 characters from the alphanumeric base character set.

Location codes are allocated from a file called the location code base list. The location code base list is created by taking the following steps.

A list of all permutations of 4 characters from the 32 characters from the base characters set is created. This gives 1,048,576 permutations (32 to the 4th power).

In the preferred embodiment, all of these permutations that spell words that may be considered offensive are removed. It is estimated that, including all major languages, the number of permutations removed in this stage would be less than 5,000. This would leave approximately 1,040,000 permutations of allowable 4 character codes.

The remaining permutations are sorted, with A first and 9 last.

The resulting list of approximately 1 million permutations is called the location code base list. An example is shown in Table 3 below.

TABLE 3

Example of Permutations of Location Code

| | | | |
|---|---|---|---|
| A | A | A | A |
| A | B | B | B |
| A | C | C | C |
| A | D | D | D |
| A | E | E | E |
| A | F | F | F |
| A | G | G | G |
| A | H | H | H |
| A | J | J | J |
| A | K | K | K |

It is from this list that a location code will be assigned to each address within each region code. Thus each region code will have its own location code base list. As a location code is assigned to a particular physical address from the address database list for the area being processed, the location code will be marked as "assigned" to prevent the same location code being used more than once within a particular canton.

Preparation of Address Database

The exact details (number of fields, field names and contents, etc.) of the address list that will be encoded will vary from country to country. However, the basics of the list will be roughly the same. Following is an example for a typical record in a USA address database.

The address list used by a satnav device contains at a minimum of these fields for each address:

address components (the human understandable portions of the address, e.g. 100 Main Street, Anytown, New York), and the latitude and longitude of the address or information that is sufficient to compute an approximate latitude and longitude for the address. Example: for a particular road there may be no information as to where on that road an address is located. Typically then, the satnav device calculates the mid-point of the road, determines the latitude and longitude of this mid-point and gives this latitude/longitude pair to the satnav software for processing and determining directions to that point.

The address components are what will be typically entered by the user. The satnav device will perform a lookup on its database and return the latitude and longitude of the address. The satnav device will then calculate a path from the latitude and longitude of where the satnav is currently located to the latitude and longitude of the desired location.

The address list of this preferred embodiment may contain one or more of the following fields:

name1—which indicates the proper name of the addressee (which could be the name of a person, a corporation, or other such as a park);

name2—which indicates text other than the proper name of the addressee;

post office box number;

floor (of a building);

room (within a building);

street address—which indicates a precise street address;

route—which indicates a named route (such as "US 101");

intersection—which indicates a major intersection, usually of two major roads;

political—which indicates a political entity (usually, this type indicates a polygon of some civil administration);

country—which indicates the national political entity, and is typically the highest order type returned by the geocoder;

administrative_area_level_1—which indicates a first-order civil entity below the country level (within the United States of America, these administrative levels are states; not all nations exhibit these administrative levels);

administrative_area_level_2—which indicates a second-order civil entity below the country level (within the United States of America, these administrative levels are counties; not all nations exhibit these administrative levels);

administrative_area_level_3—which indicates a third-order civil entity below the L2AD level (this type indicates a minor civil division; not all nations exhibit these administrative levels);

colloquial_area—which indicates a commonly-used alternative name for the entity (as an example: Kings county New York is better known as Brooklyn);

locality—which indicates an incorporated city or town political entity;

sublocality—which indicates a first-order civil entity below a locality;

neighborhood—which indicates a named neighborhood;

premises—which indicates a named location, usually a building or collection of buildings with a common name;

sub-premise—which indicates a first-order entity below a named location, usually a singular building within a collection of buildings with a common name;

postal code—which indicates a postal code as used to address postal mail within the country;

natural feature—which indicates a prominent natural feature;

airport—which indicates an airport;

park—which indicates a named park; and point of interest—which indicates a named point of interest (POI) (typically, these POI's are prominent local entities that don't easily fit in another category such as "Empire State Building" or "Statue of Liberty").

Only the fields from the listing above necessary for encoding an address are included in the preparation of the address database in the preferred embodiment of the present invention.

Several of the above mentioned address components are particularly useful when creating and assigning region codes to Level 2 Administrative Divisions (L2AD) (e.g. counties in United States of America, provinces/territories in Canada, states in Mexico) that have a population greater than 1.8 million. These address components include items such as administrative_area_level_3—which indicates a third-order civil entity below the L2AD level; a third-order civil entity indicates a minor civil division For the United States PUMA and Super-PUMA areas maintained by the US Census Bureau can be used. It is these L3ADs that are used to divide LL2ADs into cantons with populations of less than 1.8 million, as shown in FIG. 4B;

colloquial_area—which indicates a commonly-used alternative name for the entity; and locality—which indicates an incorporated city or town political entity.

This processed address list will be used to assign the location code portion of the code.

It should be obvious that it is desirable to keep the information and codes up-to-date. The above mentioned method may be used to assign location codes to newly created addresses and points of interest when new structures are built and subsequently identified to keep the information and codes up-to-date.

Allocation of Location Codes

Referring now to FIG. 5 a preferred embodiment for a method to assign location codes is depicted. Location codes may be assigned to addresses located within an individual group. In Step 20, a group to have addresses individually assigned location codes is selected.

In Step 21, the addresses in the address list for that geographical group are sorted by region code.

In Steps 22, 23, 24 and 25 the addresses are further sorted. This sorting will result in addresses that are physically close to each other (on the same street for example) having similar location codes. For example 123 Main St. may have a code of AB-2345 and 125 Main St. may have a code of AB-2346. This is done in the preferred embodiment purely for marketing reasons. Location codes may be randomly assigned to the addresses.

Referring again to FIG. 5, in Step 26 a first group of pre-sorted addresses is selected such that all addresses with the same region code are selected. In Step 27 each address is assigned a location code from the location code base list for that region code. This process can be easily done by one skilled in the art.

In Steps 28 and 29 the location code assigned in Step 27 is provided the designation "assigned" so that it will not be reused within the current group and the associated address record is provided the designation "processed" so that it will not be reassigned a new location code.

In step 30, determine whether additional addresses within this region remain which have not been assigned location codes. If there are additional unprocessed addresses, proceed back to Step 27; if all addresses have been processed, proceed to Step 31.

In Step 31, determine whether all region codes within the particular country have been processed. If they have been processed, then proceed on to Step 32 to determine if all addresses in all countries have been processed. Referring again to Step 31, if all region codes for the particular country have not been processed, proceed to Step 26. Referring again to Step 32, if all addresses in all countries in the group have been processed, the process is completed; if there are countries remaining to be processed, proceed to Step 20.

This process would be obvious to anyone skilled in the art.

Upon completion of the process depicted in FIG. 5, every address in a particular group will have been assigned a unique 6 character code consisting of a 2 character region code and a 4 character location code. These codes will be stored in a database.

All addresses or locations within a particular group (for example North America) will have the same group code. For example, all addresses and locations in the North America group would have the group code NAM.

Five Character QCODE Geotagging Method

Figure 6:
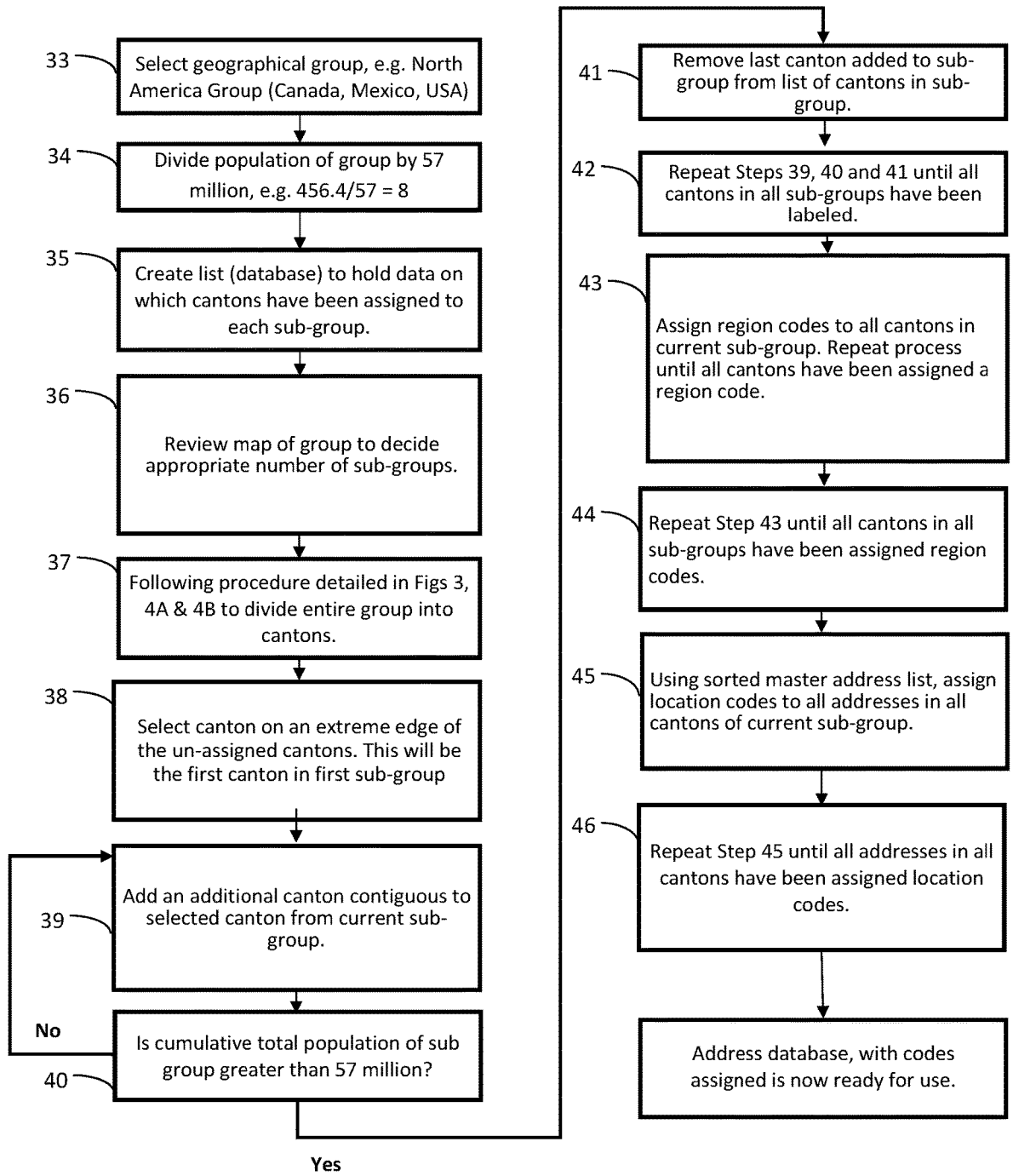
FIG. 6 depicts a flow chart for assigning exemplary five character geotags.

Referring now to FIG. 6 and the preferred embodiment depicted therein, a representative example of a method to use a five character code is presented. The example presented in FIG. 6 provides an example for using a five character code to assign addresses located in North America. As will be obvious to those skilled in the art, the method may be adapted to other geographic places and is not limited to North America in practice. In Step 33, a user will select a geographical group (e.g. North America) to which codes will be assigned. In this example, the North America group, composed of Canada, Mexico, and USA (excluding Hawaii) is selected. In Step 34, the user will determine the minimum quantity of necessary sub-groups. This may be calculated using the formula $$X = X(\text{Bar})$$

where X is an integer representing the minimal number of required sub-groups to used in providing codes to all addresses and X(Bar) is the non-rounded quantity of required sub-groups. X(bar) may be determined by use of the formula $$X(\text{Bar}) = Y/57{,}000{,}000$$

wherein Y is the population of the group.

If the decimal fraction portion of X(Bar) is less than or equal to 0.3, X is the truncated portion of X(Bar); if the decimal fraction portion of X(Bar) is greater than 0.3, X is rounded up to the next integer.

For the representative example case of the North America group, the population is 465.4 million inhabitants and X(bar) is calculated to equal 8.00 and X subsequently equals 8; thus 8 would be the minimum quantity of sub-groups that would be required to provide geotags to all addresses located in the North America Group.

Please note that alternative rounding coefficients may be chosen without deviating from the concept presented herein.

A group may be subdivided into a greater number of sub-groups than determined by the above process. In the present example for North America, at least 8 sub-groups must be provided to allow for assigning location codes to all addresses in the North America group.

Figure 7:
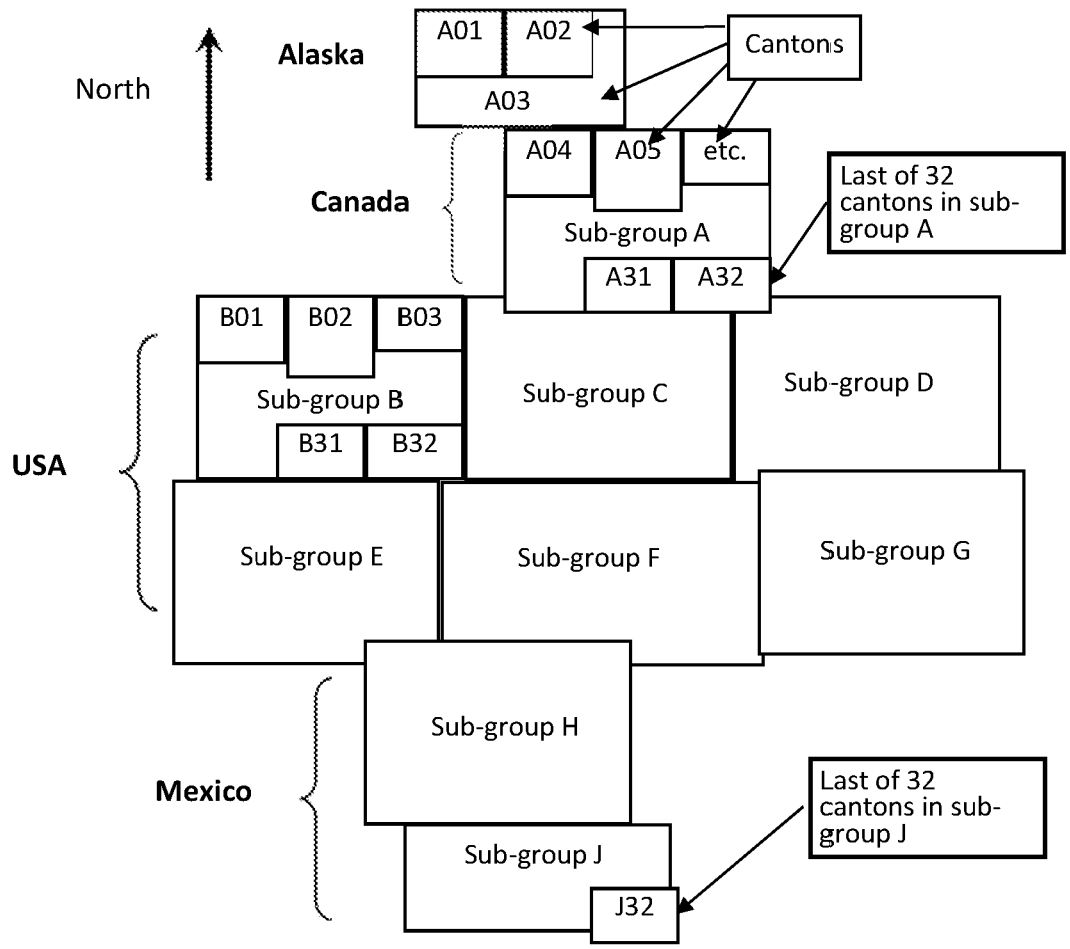
FIG. 7 depicts a representative example of subgroups.

In one preferred embodiment, depicted in FIG. 7, sub-groups may be labeled A, B, C, and so forth.

Referring again to FIG. 6, in Step 35, a database is created that will be used to store the information of which L2ADs are assigned to which sub-group. This database will comprise metadata indicating which sub-group a particular L2AD is assigned.

In Step 36, a review is made of a map of the group being processed, in this example North America. From Step 34 it was calculated that there must be at least 8 sub-groups. Canada has a population of 33.7 million; the maximum population of a sub-group is 57 million.

Referring again to FIG. 6, in Step 37, the process detailed in FIGS. 3, 4A and 4B is used to group all L2AD in the group into cantons. For L2ADs with a population greater than approximately 1,800,000, the L2AD must be divided into "sub-L2ADs" preferably using boundaries established and maintained by the local government. These sub-L2ADs will then be treated as L2ADs. Appropriate notations will be made in database.

In the present example, and in referring to FIG. 7, it is readily obvious that all of Canada can be contained in one sub-group. From a user's point of view, it may be logical to put into the same sub group as Canada all of Alaska and the L2ADs of the continental US that border on Canada. The purpose for building the sub-groups in this manner is to allow those living near the border to plan a trip across the border without leaving their sub group.

Mexico requires at least 2 sub-groups due to the size of its population. With Canada requiring 1 sub-group, that leaves 5 sub-groups available for the USA when 8 sub-groups are used as in this present example. Based on political and social factors, in the present preferred embodiment it may be better to divide the US into 6 sub-groups rather than 5 sub-groups. Therefore the total number of sub-groups for the North America group will be 9. The QCODE geotagging method would work perfectly with only 8 sub-groups but taking into account the desire of having an encoding method that results in codes that would be considered user friendly, it is preferred in this representative example to use 9 sub-groups.

Referring to FIG. 7, which is a block diagram of the North America group showing sub-groups and some cantons. Note that sub-group A includes some L2AD (counties) in the areas where the US and Canada have a common land border. In addition, sub-group H (northern Mexico) extends slightly in to the US. If sub-group H stopped at the US/Mexico border, the total population would only be 56 million. The remaining 1 million of the 57 million limit is used to encode L2ADs along the land border with the US.

Each group of L2ADs (maximum allowed population of 1.8 million), is called a canton. Cantons are labeled in a geographically sequential manner and numbered from A01 to A32, for example in sub-group A. Each sub-group has 32 cantons.

All cantons are not shown to keep the figure easy to read.

Each sub-group may be labeled sequentially (A, B, C, D, etc.) until all sub-groups have been labeled. In the current embodiment the sub-groups will be labeled A through J, letter "I" is not used.

Each sub-group may be divided into 32 cantons. A canton is comprised of a group of L2ADs and/or subdivisions of a L2AD. Each canton preferably should have a maximum population of approximately 1,800,000. In the preferred embodiment depicted in FIG. 7, cantons in sub-group A will be labeled canton A01, A02, A03, and so forth up to A32 for a total of 32 cantons. Cantons in sub-group B will be labeled B01, B02, B03, and so forth up to B32, the 32nd canton. In this preferred embodiment the characters 1, I, 0, O will be skipped when labeling cantons to reduce errors in transcription and reading. Referring to FIG. 7, the last canton of the last sub-group is labeled J32.

Cantons will preferably be labeled in an organized manner, for example, starting from the north-west corner of the sub-group, proceed east until edge of sub-group is reached, move south one L2AD, then proceed west until the western edge of the sub-group is reached, repeating this pattern until all L2ADs in the sub-group have been grouped into cantons.

In this preferred embodiment this same pattern will be used to label cantons in all sub-groups.

Referring again to FIG. 6, in Step 38 the first canton of the first sub-group processed may be chosen at an extreme edge of the sub-group. In the present preferred embodiment, the first sub-group to be processed will be labeled sub-group A. In Step 39 contiguous cantons are added to the sub-group until the total population of the sub-group is about 57 million or all 32 cantons have been used. Cantons are labeled using the sub-group letter (from the base character set) followed by a number. For example: A01, A02, B01, B02. This is repeated until all cantons in all sub-groups have been labeled. The "last" canton will be labeled J32.

In Step 40 a check is made to see if the maximum allowable population (approximately 57 million) has been reached. If not, then Step 39 is repeated. If maximum population has been reached or exceeded then proceed to Step 41.

In step 41, as the total population in the sub-group has exceeded the available address quantity (57 million), the last canton added to the sub-group shall be removed to bring the total population of the sub-group below the 57 million maximum.

In Step 42, a check is made to determine if all cantons have been added to a sub-group. If there are cantons remaining to be processed, return to Step 39. If all cantons have been processed, proceed to Step 43.

In Step 43 single character region codes are assigned to all cantons. Each sub-group (e.g. A, B, C, . . . ) is processed sequentially. As an example, canton A-01 is assigned region code A, canton A02 is assigned region code B, canton A32 is assigned region code 9. Because there are 9 sub-groups, each single character region code (32 different characters) will be assigned to 9 different cantons, each canton belonging to a different sub-group.

In Step 44, the process of Step 43 is repeated until all cantons in all sub-groups have been assigned a region code.

In Step 45, location codes are assigned to each address. Using a sorted master address list for the group, the first address in sub-group A, canton 01 is assigned the first available location code in the location code list, AAA for example. At the same time, the region code assigned to the canton is assigned to the address. Thus the first address from the first canton (canton A01) will be assigned a region code plus a location code of A-AAAA. The next address will be assigned a code of A-AAAB.

In Step 46, Step 45 is repeated until all addresses in the group have been assigned region codes and location codes. These two codes make up the full QCODE code, e.g. A-B234.

Allocation of Final Region Codes to Cantons.

In each group, the same code will be used several times, depending on how many sub-groups the group is divided into. In the preferred embodiment of the present invention, codes will be assigned to each address in the group in a manner that increases the probability that the first address proposed to the user of a satnav system is the desired one (note, in the present example, there will be nine different addresses that could be proposed for each code entered into the satnav device within North America).

As those skilled in the art are aware there are several methods which may allow for the most probable address from the set of (in this example) 9 codes to be determined. One such method would be to have addresses sorted from closest to farthest from the users' current location.

One preferred method to maximize the distances between locations assigned like codes would be to consistently begin assigning cantons at a corner of the first sub-group (e.g. the L2AD in the northwest corner of the sub-group would be assigned as the first canton) and then assigning cantons in a consistent method from there (e.g., the L2AD due east of the first L2AD would be assigned as the second canton, the next canton due east of the second canton would be assigned as the third canton, and so forth until there are no more L2ADs due east of the previously assigned canton within the sub-group; and then the first L2AD located due south of the first canton would be assigned as the next canton, and then the first L2AD located due east of this newly assigned canton would be assigned as the next canton; repeating this process until there are no more unassigned L2ADs in the sub-group). Upon assigning cantons to all L2ADs within the first sub-group, cantons can be assigned to other sub-groups following the same assignment pattern.

In another preferred embodiment of the present invention a set of codes comprising only 4 characters may be used following the procedures similar to those used to establish 5 character long codes. With 4 characters, each code would be used/reused approximately 310 times.

Additional QCODE Geotagging Embodiments (Special QCODE Geotags)

In addition to the 5 and 6 character embodiments described previously, there are several other novel embodiments of the QCODE geotagging method. Representative examples of several of these additional embodiments are described herewith.

In a preferred embodiment of the present invention using special QCODE geotags, the processing software would automatically determine which type of code was entered by the user. This is accomplished by reserving certain code characters for special applications, thus allowing the software to automatically determine which type of code was entered and then select the appropriate database to use.

In the standard 6 character embodiment, the full base character set is used. In the special geotagging embodiments a modified character set may be used.

In the preferred embodiment for using the special codes, the last (fourth) character of the location code may be limited to the letters of the alphabet, excluding I and O and with no numbers used. This reduces the number of permutations available for the location code and thus the maximum population of the L2ADs that are grouped into cantons. The maximum population of each canton would be 1.3 million instead of the 1.8 million used in the standard 6 character embodiment. This change has no material effect on the processes that have been described for the implementation of the 6 character embodiment.

This modification makes it easy for the software to determine if the code entered is a standard code or a special code. For example, if the $4^{th}$ character of the location code is a number (2 through 9, 0 and 1 are not used), then the code entered is a special code.

In addition, the software may also identify the number of characters entered to determine if the code entered is a special code or a standard code. In this embodiment, the standard code is 6 characters long. All special codes are also 6 characters long with the exception of the personalized codes which can be from 4 to 8 characters.

As should be obvious to those skilled in the art, the example given is just one of many methods that may be used, in conjunction with the appropriate allocation of codes to enable the satnav software to distinguish which type of code was entered. One could also require the user to indicate or select the type of code they are entering. However to anyone skilled in the art this is obviously a less preferred method.

Figure 11:
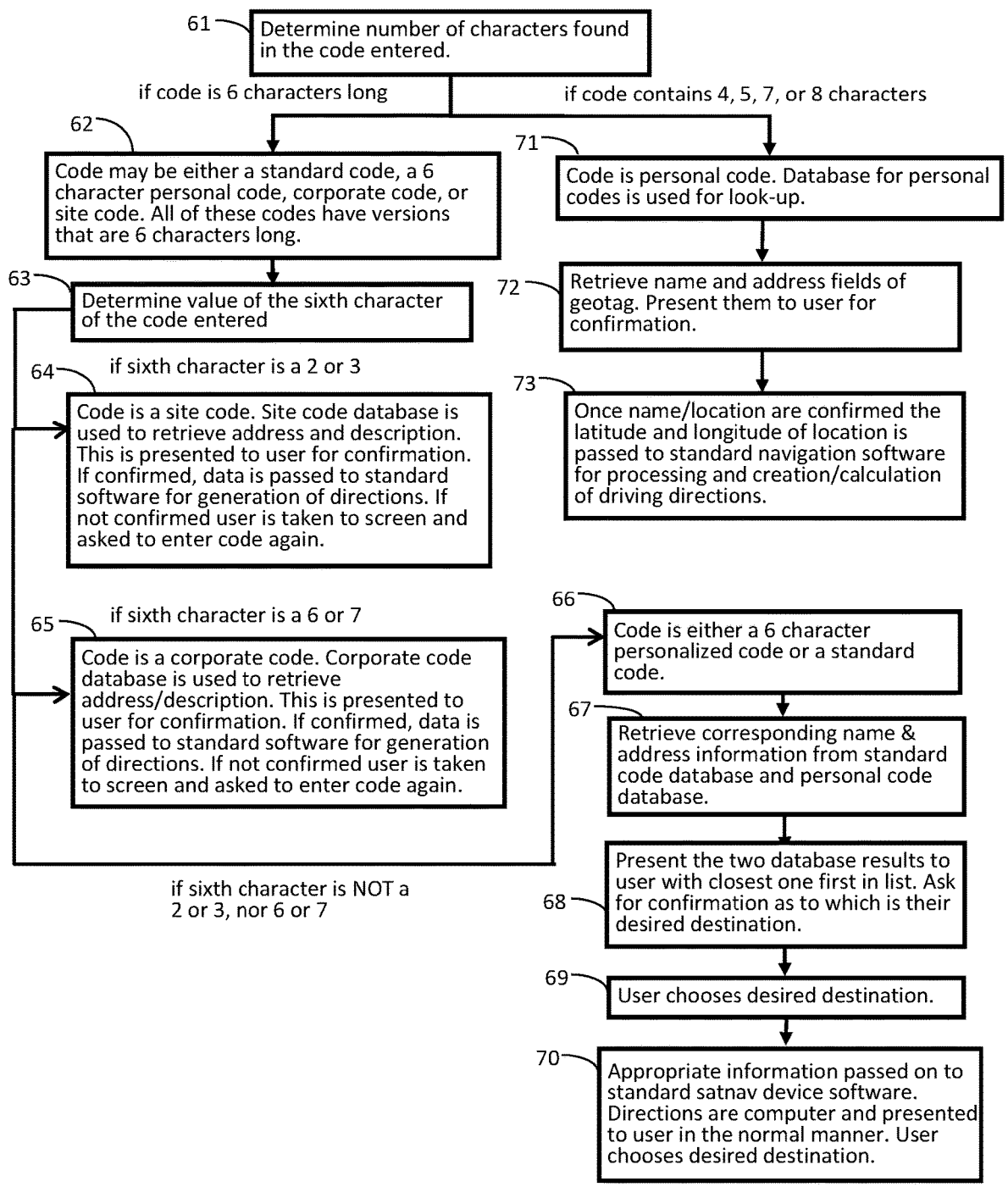
FIG. 11 depicts a flow chart of a representative exemplary process to determine classification of a geotag entered when using extended geotags.

Referring now to FIG. 11, an example is provided of how a system using special codes works. All of the descriptions for setting up a special code are based on having as standard the 6 character embodiment. In this embodiment a modified character set is used.

As an additional enhancement to the special geotagging system, codes longer than 6 characters can be used in special application.

As an example, for special codes a corporate customer may want to have their code to be more than 6 characters. McDonald's may prefer to have their special code be in the format: MAC-XXXX or MCD-XXXX. Programming the software to be able to identify these codes is easily done. The software may also easily be programmed such that when a user enters "MAC" the satnav returns to the user the closest McDonald's to the user's location.

Although there may be other geotagging methods that allow geotagging with more than 6 characters, these methods are not as suitable to the user as the QCODE geotagging method. These other methods typically geocode a location by using an algorithm to shorten the latitude/longitude of the location or the coordinates of the location on a grid map system. This results in a geotag that can be something like AB2-2SDF or A23-56GH. With the QCODE geotagging method the geotag can be chosen to have a "link" to the group of locations being geocoded. As an example, all QCODE geotags for McDonald's restaurants begin with "MD" or "MAC" or "MCD." This is of an obvious benefit to the corporate customer and to the user.

Site QCODE Geotags

In addition to the geocoding of postal addresses and points of interest (POI), the QCODE geotagging method can be used to geocode non-postal addresses or locations using the methods described previously. Henceforth in this document, this process will be termed 'site coding.'

As an example of using site coding, consider a large university, such as Stanford University in California. This university has over 15,000 students and a main campus of more than 8,000 acres (3,000 ha). On the main campus there are 100 s of buildings and other facilities.

Many of the important on-campus locations do not have postal addresses. As is usual for such large facilities mail is delivered to only a few addresses and then either collected from the delivery point or distributed by the university itself.

Without these important on-campus locations having postal addresses it can be very difficult for someone to find their way around the campus. Many of the buildings have specific street addresses but several entrances—each without a separate street address; the names of streets on campus property may not be included in third party maps; many points of interest for university visitors may not have addresses at all.

Here is an example of the description of parking lots on the Stanford University campus. This description was taken from the Stanford University website.

Parking Options
(Near the Stanford Visitor Center)
Visitor Center Lot (L-95)
Galvez Street, between Nelson Road and Campus Drive
(Visitor Parking Permit Vending Machine)
Varsity Lot (L-97)
Nelson Road, off Galvez Street adjacent to Stanford Stadium
(Meters or purchase Parking Permit at Visitor Center Lot)

With the 6 character QCODE geotagging method, the university could have its own region code, "SU" for example, and approximately 65,000 location codes unique to Stanford University. In one preferred embodiment, all site codes will end in either a 2 or a 3 to allow the processing software to immediately identify the code entered as a site code.

These geotags could be downloaded from the Stanford University website or other internet based source and added to a user's satnav device, much like custom POIs can be added to current models of satnav devices.

The university would issue a list of the codes for the various important points on its campus.

For example, important locations at the football stadium could be encoded:
SU-BBB2—Stanford Stadium—West Entrance;
SU-DDD3—Stanford Stadium—East Entrance;
SU-ABC2—Stanford Stadium—VIP Parking; and
SU-CDE3—Stanford Stadium—Parking Lot A In New York State there is another large university, Syracuse University, that may also want its own site codes. They may also want to use "SU" as the region code for their site codes because that is what the university calls itself when using an abbreviation.

Insuring that the satnav device knows which region code database to use, each site code may be defined by a bounding polygon. If the satnav device is located within the bounding polygon of the site code for Stanford University, the device would use the database entries for Stanford. If the satnav device is located within the polygon defined for Syracuse University, then the database of location codes for Syracuse University would be used.

If the satnav device is not located in either bounding polygon, then the device may be programmed to display the site code from the closest site and ask the user to confirm that they want to use the suggested site code.

The region code "SU" would also, most probably, be assigned to a canton elsewhere in the North America group. Again, the satnav device may be easily programmed to make a logical choice of which set of geotags to use. The user could be asked to confirm the choice made by the software.

The satnav software can easily be programmed by someone skilled in the art to, as a first step, determine if it is located within a predefined area of a site code. If that is the case, then the database of site QCODE code may be used to look-up the code entered by the user.

Using this site-coding method means that there are essentially an unlimited number of region codes available for special coding because the region codes can be reused.

This is similar to the way FM radio frequencies are allocated in the US. There are only 100 different FM radio channels (frequencies) however there are nearly 10,000 FM radio stations in the US. Stations broadcasting on the same frequency are kept separated by such large distances that one does not interfere with the other.

Site coding could also allow workers at a particular municipality or company to use relatively inexpensive satnav devices (either a smartphone or a stand-alone satnav system such as those made by Garmin and TomTom) to locate particular items of interest. In the case of a maintenance worker a representative example would be a streetlight, a traffic light or a manhole cover. Site coding would also allow a maintenance system to have a coding system to uniquely identify each item requiring maintenance. Currently the locations of items of interest are typically described using easily misunderstood verbal descriptions. The present invention provides a more elegant and efficient way to identify these locations.

The site coding technique may be used over a broad range of applications: national parks, large industrial complexes, shopping centers, etc. Some satnav device manufacturers are already supplying systems that can be used to help customers find their way around shopping centers and airports. Google Maps now supplies maps and directions for the insides of IKEA stores in the USA. NAVTEQ currently has location data on several hundred large buildings such as airports. The QCODE geotagging method may integrate with these systems very easily and would provide a standard across all satnav device manufacturers.

Site coding may also be used with "indoor mapping" applications to assign individual geotags to specific indoor locations such as stores within a large shopping mall or airline counters within an airport.

Personal QCODE Geotags

In another embodiment of the present invention, the QCODE geotagging method may be used to provide individualized codes to individual persons or businesses. Much like many states in the US allow motorists to have individualized license plates, the QCODE geotagging method may do this a well. These individualized codes may be sold to individual persons or businesses.

An example of a personal code for a person would be: A SMITH, or DK JOHNS. Although the personal code may be displayed with spaces included to enhance the readability, the code would be entered into the satnav device without spaces. If spaces are entered the satnav device software will remove the spaces before any processing is started.

It is envisioned that the personal codes may be preferentially offered in codes from 4 to 10 characters long.

The number of meaningful personal codes can be increased significantly by adding to the address database the L1AD (e.g. the state in the United States) for each address, POI or special code. As an example, in the North America group, for the United States, the appropriate state (e.g. New York, California, Texas, etc.) would be added to each record.

With the addition of the L1AD to the database then the personal code "JOHN SMITH" may be used 50 times in the United States. When the user enters the code "JOHN SMITH" the satnav device would respond with the address of the "JOHN SMITH" in the state where the satnav is located. User would be asked to confirm is this is the "JOHN SMITH" location they want. If user confirms "YES" then the normal process continues.

While the satnav device is awaiting the confirmation, it can be calculating the distance to the next closest "JOHN SMITH" locations. If user selects "No, show me more addresses," then the next closest "JOHN SMITH" locations can be displayed, in order of their distance, closest first.

The user then confirms which of these is the "JOHN SMITH" they want.

Using this method may require the user to take the extra step of choosing another location but this would not happen frequently.

There are other methods that may be used to allow the repeated use of the same personal code such as displaying the closest location first (regardless of L1AD), and then the remaining "JOHN SMITH" location if the closest one is not the one desired.

The above described methods are not meant to in any way limit the ways that the processing of geotags is done by the satnav device.

Corporate Geotags

Organizations that have multiple locations such as McDonald's or Subway may desire to have geotags that are unique to them, in addition to the standard geotag that would be available for any of their locations that have postal addresses. Many of the outlets of such organizations may have locations that do not have postal addresses, or the postal address is not the actual location of the store.

As part of their normal marketing activity these companies want to make it easy for customers to find the closest outlet for their brand. A satnav device would seem to be ideal for this however in many cases the location of the outlet does not have a normal or useful postal address. They may be located in a large shopping center, or other places where the mailing address for the outlet may not be close to the physical location of the actual outlet.

Furthermore, in one preferred embodiment of the present invention, all corporate geotags will end in either the numeral six or seven. This will enable, for example, the region code MD to be used in the standard QCODE geotagging process system, as well as for McDonald's (MD-XXX6). The standard code with a region code of "MD" will not end in a number. The McDonald's corporate codes will end in either a six or a seven and therefore are easily distinguished by the processing software.

The use of smartphones with access to the internet is increasing rapidly. An application may easily be written that would help the smartphone user to quickly find the closest "McDonalds."

They simply enter "MD" and the geotag of the closest McDonald's is returned. The smart phone would then give them directions to that location. Methods to develop a query program to support such an application are well known to database developers and the method used to produce this query is not critical to the use of this invention.

In a preferred embodiment of these special types of geotags the software would automatically determine which type of geotag was entered by the user. This is accomplished by reserving certain codes for these special applications, thus allowing the software to automatically determine which type of code was entered and then select the appropriate database to use.

It is also envisioned that it may be preferable for the corporate geotag to be 7 characters long. For example: for McDonald's—MCD-XXXX or MAC-XXXX, depending on the preference of the corporate customer. Allowing for corporate geotags to be 7 characters long and still automatically distinguish them from other types of geotags is easily done by someone skilled in the art.

Universal Postal Codes

In another preferred embodiment of the QCODE geotagging method, by adding to the code, preferably before the region code for ease of readability, the two letter ISO 3166-1 code (or similar universally accepted codes) for the country in which the address is located, the resulting code may be used as a universal postal code system.

For example: for an address in the United States with a QCODE geotag of LA-2345, the addition of the two character ISO 3166-1 code for the United States "US" before the code would give a universal postal code for that address of "US-LA-2345." Since the QCODE geotagging method assigns a unique code to every address within a particular geographical area (such a North America) the addition of a two character country code would uniquely identify the address.

For anyone skilled in the art, it is obvious that this universal postal code could be linked via a database to enable individual country postal systems to sort mail according to any method that they would normally use for the delivery of mail.

Using QCODE Geotags in a Satnav Device

Refer again to the satnav system presented in FIG. 1. In a preferred embodiment for using the satnav system with a 6 character QCODE geotag, a user will follow the process shown in FIG. 9.

Figure 9:
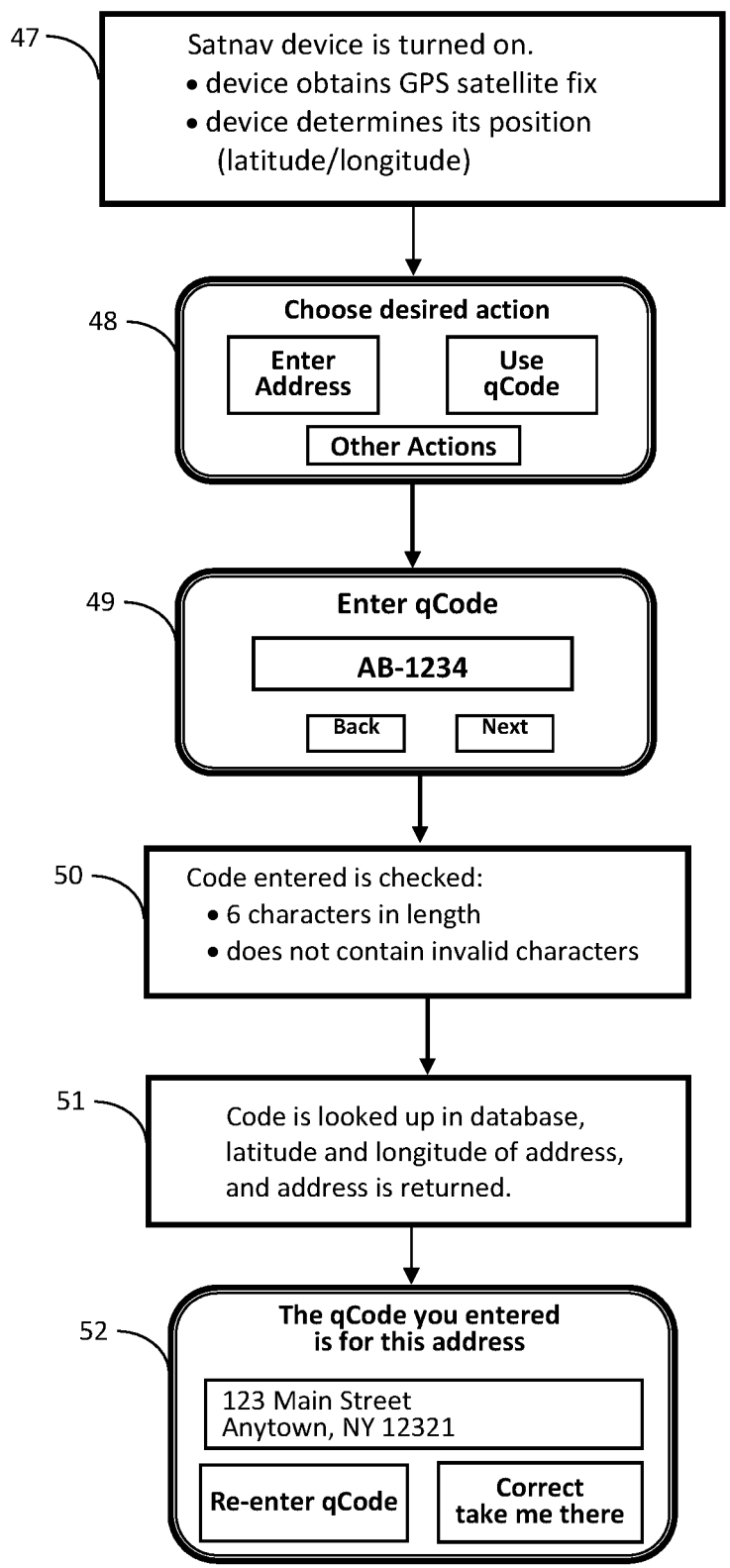
FIG. 9 depicts a flow chart of a representative example for using an exemplary 6 character geotag.

Referring to FIG. 9 and the preferred embodiment depicted therein, in Step 47 the satnav device is turned on. The device goes through its normal start-up routine, obtains fixes on GPS satellites and determines its location (latitude and longitude). In the representative example shown, the satnav device determines it is located in North America. Therefore it will use the North America group database of QCODE geotags.

For this example it is assumed that device has a touch screen display. Other methods of user input such as a keyboard may be used for the user to interact with the satnav device.

In Step 48, the user is presented with a screen. User chooses to use a QCODE geotag to input the details of his desired destination.

In Step 49, user is presented with screen where they enter the QCODE code of the desired destination.

In Step 50, processing software of the satnav devices checks the code: does the code entered have the correct number of characters, and check for invalid characters.

If the entered code fails any of the tests then user is taken to a screen where he is asked to re-enter the code. This screen is not shown.

In Step 51, the code has been looked up in a database (the North America database in this example) and the latitude/longitude pair plus the address are retrieved from the database.

In Step 52 the address associated with the code is presented to the user to confirm that it is correct. If address is correct user selects "Correct, take me there" button. Satnav device then proceeds to give direction to the address as if it had been entered manually. This is a process well known to those skilled in the art.

If address is not correct user selects "Re-enter QCODE" and is then taken to a screen where he can re-enter the code.

Using the 5 Character QCODE Geotag

Refer again to the satnav system presented in FIG. 1. In a preferred embodiment for using the satnav system with a 5 character QCODE geotag, a user will follow the process shown in FIG. 10.

Figure 10:
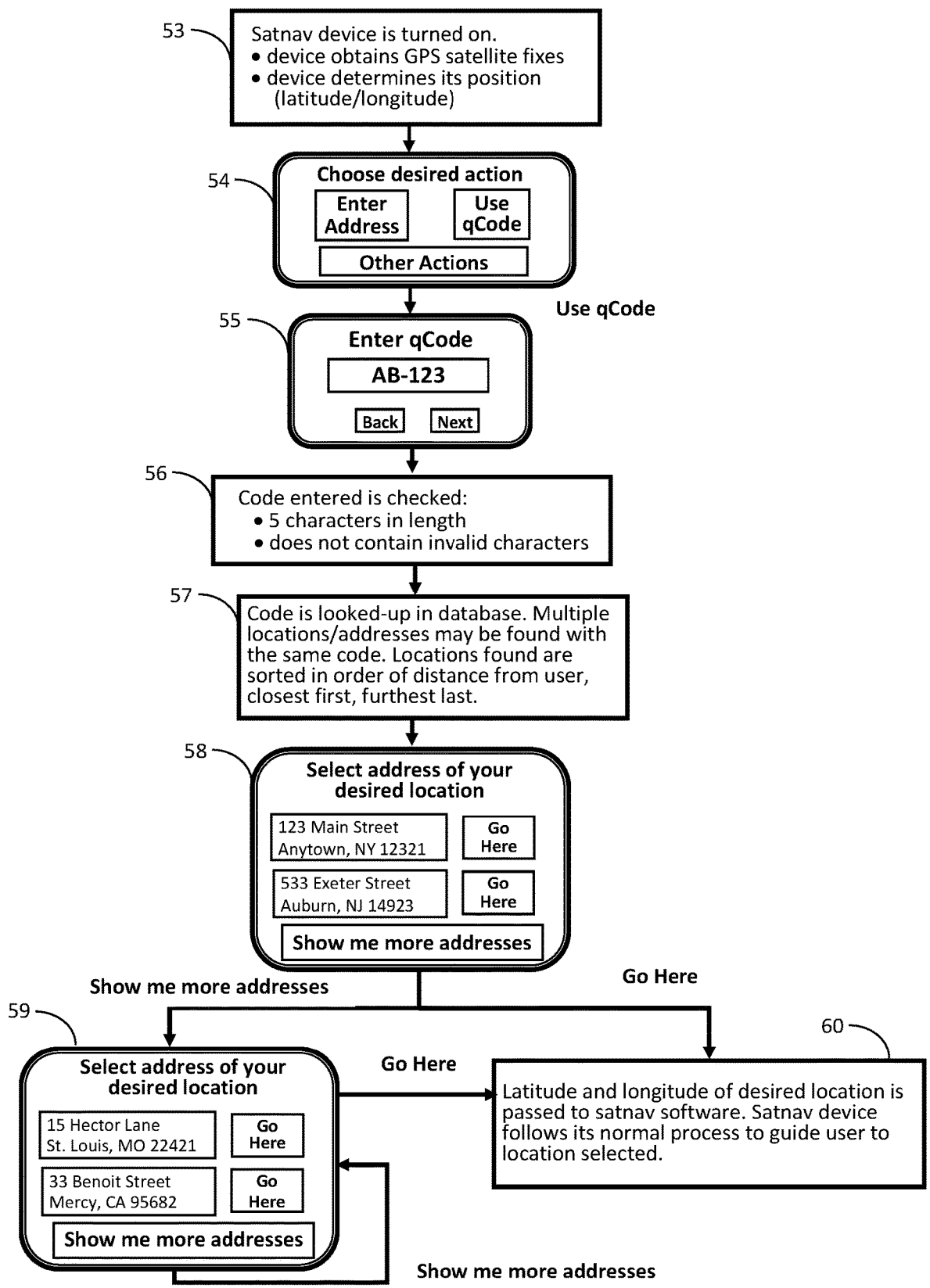
FIG. 10 depicts a flow chart of a representative example for using an exemplary 5 character geotag.

Now referring to FIG. 10, in Step 53 the satnav device is turned on. The device goes through its normal start-up routine, obtains fixes on GPS satellites and determines its location (latitude and longitude). In example shown, satnav device determines it is located in North America. Therefore it will use the North America database of QCODE geotags.

For this example it is assumed that device has a touch screen display. A keyboard is not shown for reasons of clarity.

In Step 54, the user is presented with a screen. User chooses to use a QCODE code to select his desired destination.

In Step 55, user is presented with screen where they enter the code of the desired destination and then click "Next."

In Step 56, processing software of the satnav devices checks the code. Checks are made for invalid characters, such as, in this embodiment, I, O, 1, and 0.

If entered code fails any of the tests then user is taken to screen where he is asked to re-enter the code. This screen is not shown.

In Step 57, the code has been looked up in database (the North America database in this example). Because the same code is assigned to multiple addresses (9 addresses in the North America example), multiple addresses will be found in the database for the same code.

In the preferred embodiment these results are sorted by distance from the user, nearest address first, furthest address last.

In Step 58 the two closest addresses are presented to the user, the closest address shown above the second closest. The screen presented to the user asks them to choose which of the two addresses is their desired location. It is estimated that the average distance between any two locations with the same code will be approximately 1,000 kilometers/600 miles. According to data from the US Census Bureau, the average non-work commute car journey in the US is 7.6 miles. Based on these two facts, it is presumed that there is a high probability that one of the first two locations presented to the user will be the location they desire.

If neither of the locations shown is the one desired by the user then he/she selects the "Show me more addresses." button.

As shown in Step 59, the next two (in distance) addresses are presented to the user. This process is repeated until the desire location is presented and the user selects the "Go Here" button.

In Step 60, the latitude and longitude of the selected location is passed on to the software of the satnav device. The satnav device then follows its normal process to provide directions to the desired location.

It is obvious that if desired, the screen shown in Step 6 may show more than 2 addresses which means that the likelihood that the desired location is presented during the first presentation would be increased even further. One of the factors that may determine the number of addresses presented at one time would be the size of the screen and the size of the font used to present the information.

Using Special QCODE Geotags

Refer again to the satnav system presented in FIG. 1. In a preferred embodiment for using the satnav system with special QCODE geotags, a user may follow the process shown in FIG. 11.

Referring now to FIG. 11, a code has been entered into the satnav device by the user. The software must determine which type of special code the entered code is and then use the appropriate database to retrieve the latitude/longitude pair associated with that code and then calculate directions to the desired location.

In Step 61 the software determines the number of characters in the entered code.

In Step 62, all codes that are 6 characters long are processed by the software to determine if they are a personal code, corporate code or a site code.

In Step 63, the value of the 6th character of the entered code is determined.

In Step 64, if the value of the 6th character is 2 or 3, then the code is a site code. This site code is looked up in the site code database; the corresponding address data is retrieved, and presented to the user. If user confirms the address data, then that data is passed to the standard software for generation of driving directions. If the user does not confirm the address information to be correct, then user is taken to an error screen and requested to check the code and re-enter it.

In Step 65, if the sixth character is a 6 or a 7 then the code is determined to be a corporate code. The corporate code is looked up in the corporate code database and the process of Step 64 is followed.

In Step 66, if the 6th character is not a two or a three, nor a six nor a seven, then the code is either a standard code or a personalized code.

In Step 67, the standard code address information in retrieved from the standard address database and the personalized code information is retrieved from the appropriate database.

Next the process detailed in Step 64 is followed.

In Step 68, the two addresses retrieved in Step 67 are presented to the user. They are presented in the order of closeness to user.

In Step 69 the user selects which of the addresses/locations is his desired destination.

In Step 70 the necessary information for the location chosen by the user is passed on to the normal satnav software. The satnav software then calculates the best path to the destination.

If the code entered in Step 61 has 4, 5, 7, or 8 characters, then it is identified as a personal code.

In Step 71 the database for personal codes is used to look up the address associated with the code.

In Step 72 the name and address information for the corresponding address is presented to the user for confirmation.

In Step 73, after user has confirmed which address he wants, the appropriate information is passed to the standard satnav device software. The software then calculates the appropriate directions to the desired destination.

Examples of Methods of Displaying QCODE Geocodes

Referring now to FIG. 12, showing examples of how QCODE geocode may be displayed. The geocodes are shown in bold type only as an aid to the reader. These examples do not limit in any way the various ways that geocodes can be displayed in actual use. The example of a site codes shows how the same code can be used for two different locations. The satnav device knows which location is the desired one based on the location of the device at the time the code is entered into the satnav device.

Although several embodiments of the present invention and its advantages have been described in detail, it should be understood that various changes, substitutions and alterations can be made herein without departing from the spirit and scope of the invention. The various embodiments used to describe the principles of the present invention are by way of illustration only and should not be construed in any way to limit the scope of the invention. Those skilled in the art will understand that the principles of the present invention may be implemented in any suitably arranged device.

I claim:

1. A satnav system implemented method for coding geographic locations associated with a desired object anywhere wherein the satnav system comprises a satnav device, wherein the method is implemented by the satnav device, the method comprising the steps of:
    systematically assigning a code to a specific geographic location where the code is comprised of a core code and an ancillary code;
    wherein the specific geographic location is identified by a latitude longitude pair;
    said code and latitude longitude pair are stored in a database;
    said database is stored remotely on a server or locally on the satnav device;
    wherein a user of the code can, for purposes of identifying the geographic location, identify the desired geographic location by entering the code on said satnav device using only the core code wherein the combined length of the core code is seven to ten characters;
    accessing by the satnav device the core code for said geographic location;
    performing a lookup in the database returning the latitude longitude pair to the satnav device;
    and directing the user to said specific geographic location;
    wherein the assigning of codes follows Zipf's law or the rank-size distribution rule.

2. The method of claim 1 wherein the combined length of the core code is seven or eight characters.

3. The method of claim 2 wherein the core code is comprised of a region code and a location code, and the ancillary code is comprised of a group code and an extended location code.

4. The method of claim 3 wherein the geographic location has a street address.

5. The method of claim 4 wherein the region code is purchased by a corporate customer.

6. The method of claim 4 wherein the region code and location code are specific to a particular individual.

7. The method of claim 1 wherein the code is comprised of a 32 base character set consisting of the alphabetic character set excepting I and O and the numeric character set excepting 0 and 1.

8. The method of claim 1 wherein the code is comprised of an 43 base character set consisting of the Cyrillic character set and the numeric character set.

9. The method of claim 1 wherein the code is comprised of a base character set consisting of computer generated symbols.

10. The method of claim 1 wherein the code is comprised of a base character set consisting of the Cantonese character set and the numeric character set.

11. A navigation system for generating routing information, the navigation system comprising:
    a satnav device comprising a processor, a user display, a software code, said software code programmed to run the satnav device, a user input device, a ROM, a RAM, a database, a power supply, a GPS receiver, and a GPS antenna; and
    a GPS satellite network; said GPS receiver receiving location information from the GPS satellite network via the GPS antenna wherein said database comprises a listing of geographic locations and a listing of codes and wherein each code in said listing of codes consisting of a group code, a region code, a location code, and an extended location code wherein further each code is assigned following Zipf's law or the rank-size distribution rule; wherein a user using said navigation system needs only to enter a region code and a location code to use said navigation system wherein the combined length of the region code and the location code is seven to ten characters.

12. The navigation system of claim 11 wherein the combined length of the region code and the location code is seven or eight characters.

13. The system of claim 12 wherein the region code is purchased by a corporate customer.

14. The system of claim 13 wherein the region code is specific to a particular location.

\* \* \* \* \*